(12) United States Patent
Neboian et al.

(10) Patent No.: US 11,400,641 B2
(45) Date of Patent: Aug. 2, 2022

(54) APPARATUS AND METHOD FOR FORMING A THREE-DIMENSIONAL OBJECT

(71) Applicant: XIONEER SYSTEMS GmbH, Vienna (AT)

(72) Inventors: Andrei Neboian, Vienna (AT); Robert Hein, Vienna (AT)

(73) Assignee: XIONEER SYSTEMS GMBH, Vienna (AT)

( * ) Notice: Subject to any disclaimer, the term of this patent is extended or adjusted under 35 U.S.C. 154(b) by 156 days.

(21) Appl. No.: 15/571,788

(22) PCT Filed: May 4, 2016

(86) PCT No.: PCT/EP2016/059985
§ 371 (c)(1),
(2) Date: Nov. 3, 2017

(87) PCT Pub. No.: WO2016/177772
PCT Pub. Date: Nov. 10, 2016

(65) Prior Publication Data
US 2019/0118467 A1 Apr. 25, 2019

(30) Foreign Application Priority Data
May 6, 2015 (AT) .............................. A 50366/2015

(51) Int. Cl.
*B29C 64/118* (2017.01)
*B33Y 10/00* (2015.01)
*B33Y 30/00* (2015.01)
*B33Y 40/00* (2020.01)
*B29C 64/209* (2017.01)
(Continued)

(52) U.S. Cl.
CPC .......... *B29C 64/118* (2017.08); *B29C 64/209* (2017.08); *B29C 64/236* (2017.08); *B33Y 10/00* (2014.12); *B33Y 30/00* (2014.12); *B33Y 40/00* (2014.12); *B41J 2/51* (2013.01)

(58) Field of Classification Search
CPC ......... B33Y 30/00; B33Y 40/00; B33Y 10/00; B29C 64/20; B29C 64/118; B29C 64/209; B29C 64/245; B41J 2/51
See application file for complete search history.

(56) References Cited

U.S. PATENT DOCUMENTS 6,253,116 B1 * 6/2001 Zhang .................... B33Y 10/00
700/119
6,629,011 B1 9/2003 Calderon et al.
(Continued)

FOREIGN PATENT DOCUMENTS

CN 103522547 A 1/2014
EP 1 974 931 A1 10/2008
(Continued)

OTHER PUBLICATIONS

International Search Report, dated Sep. 21, 2016, for PCT/EP2016/059985, 8 pages.

*Primary Examiner* — Francisco W Tschen
*Assistant Examiner* — Elisa H Vera
(74) *Attorney, Agent, or Firm* — Seed Intellectual Property Law Group LLP

(57) ABSTRACT

An apparatus and a method for forming a dimensionally stable, three-dimensional object (12) by consecutively or continuously applying and hardening a shapeable printing material (89).

17 Claims, 9 Drawing Sheets

Horizontal positioning system (view from above)

(51) Int. Cl.
    *B29C 64/236*     (2017.01)
    *B41J 2/51*     (2006.01)

(56) References Cited

U.S. PATENT DOCUMENTS

| | | | |
|---|---|---|---|
| 8,926,484 B1 | 1/2015 | Comb et al. | |
| 2006/0170729 A1* | 8/2006 | Sloan | B41J 25/304 |
| | | | 347/37 |
| 2008/0053998 A1* | 3/2008 | Hochsmann | B29C 64/153 |
| | | | 220/287 |
| 2010/0096489 A1 | 4/2010 | Taatjes et al. | |
| 2013/0089642 A1 | 4/2013 | Lipson et al. | |
| 2013/0161439 A1 | 6/2013 | Beery et al. | |
| 2014/0117585 A1 | 5/2014 | Douglas et al. | |
| 2014/0159284 A1 | 6/2014 | Leavitt | |
| 2014/0265040 A1 | 9/2014 | Batchelder | |
| 2014/0363532 A1* | 12/2014 | Wolfgram | B29C 64/106 |
| | | | 425/113 |
| 2015/0137401 A1* | 5/2015 | Comb | B29C 64/209 |
| | | | 264/39 |
| 2016/0193785 A1* | 7/2016 | Bell | B33Y 10/00 |
| | | | 264/255 |
| 2017/0246801 A1* | 8/2017 | Stodder | B29C 64/336 |
| 2018/0326660 A1* | 11/2018 | Gifford | B29C 64/209 |

FOREIGN PATENT DOCUMENTS

| | | | |
|---|---|---|---|
| JP | 2013-67121 A | 4/2013 | |
| WO | 97/17664 A1 | 5/1997 | |
| WO | 2013/086577 A1 | 6/2013 | |
| WO | WO-2016057028 A1 * | 4/2016 | B33Y 30/00 |

* cited by examiner

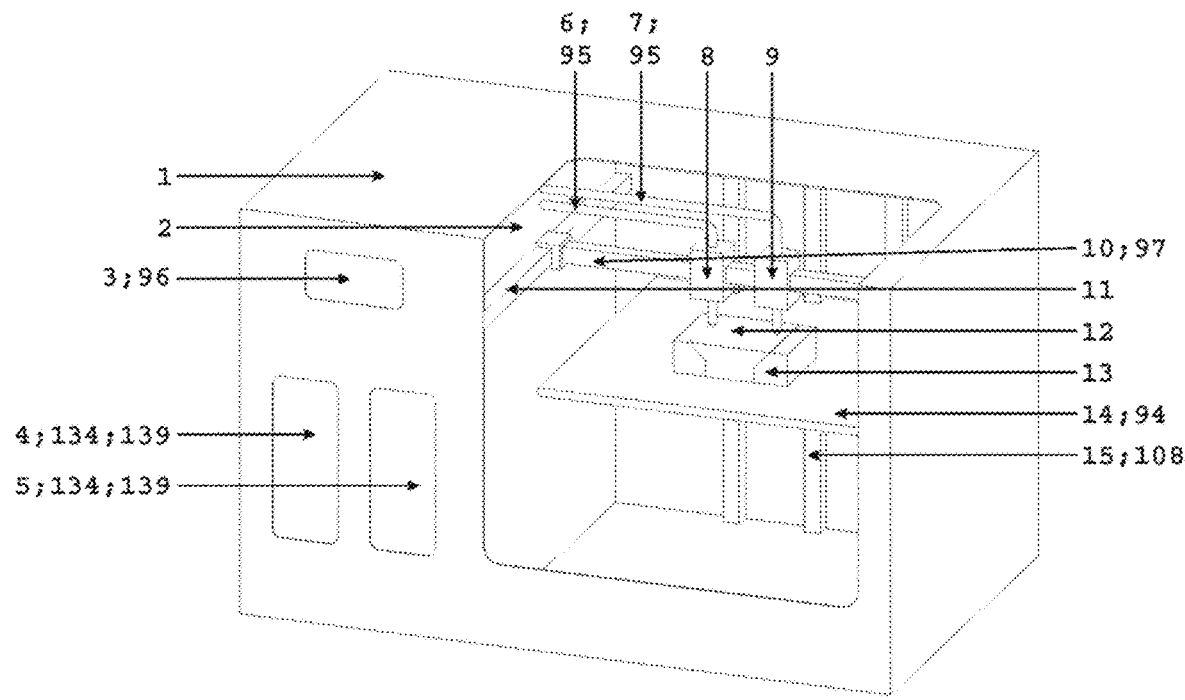
Fig. 1: Extrusion-based 3D printer (schematic)
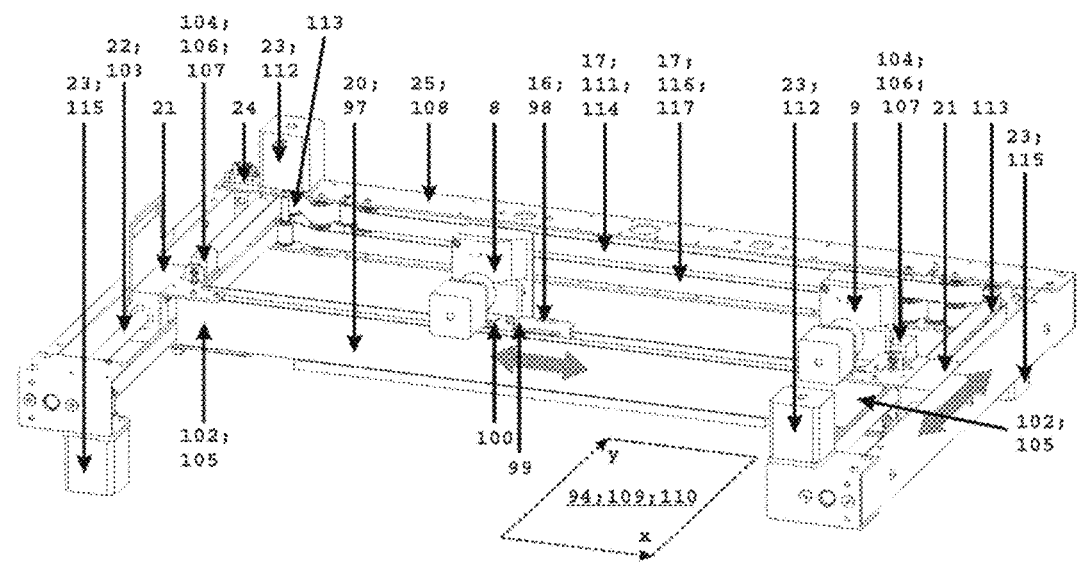
Fig. 2: Horizontal positioning system (view from the front)

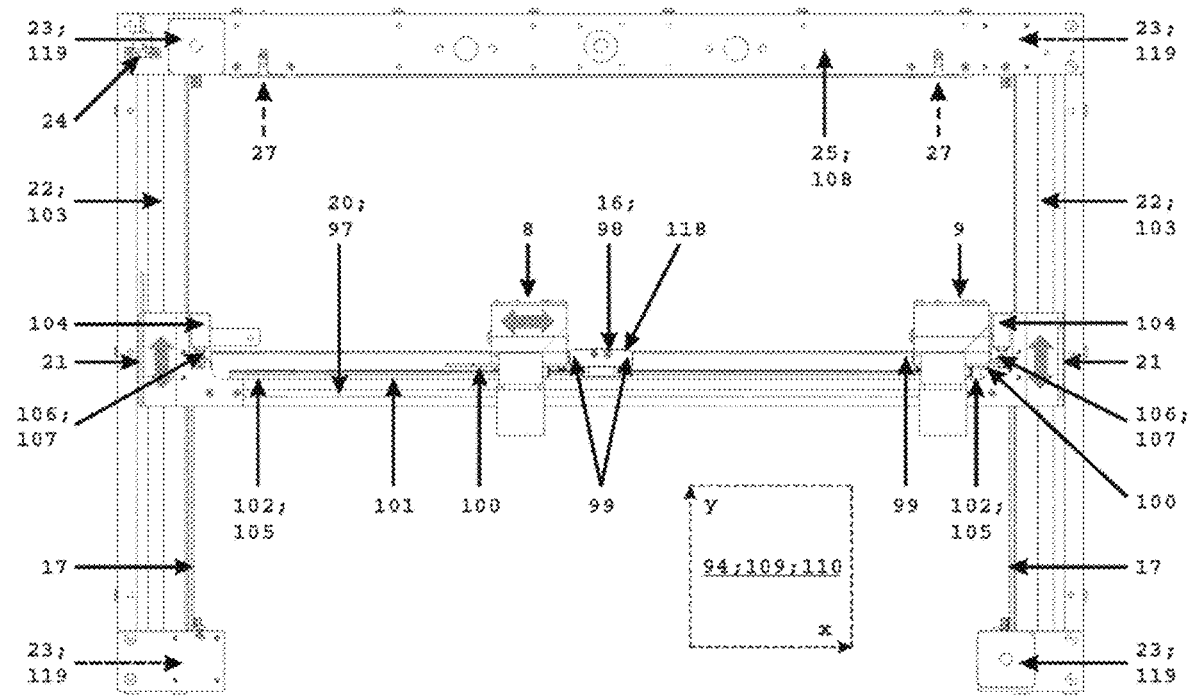
Fig. 3: Horizontal positioning system (view from above)
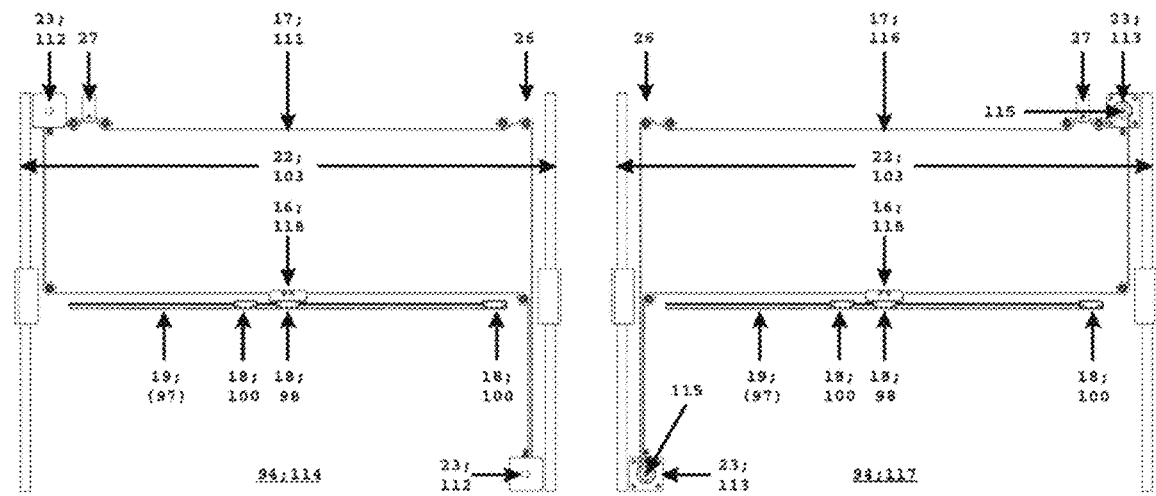
Fig. 4: Toothed belt system (simplified)

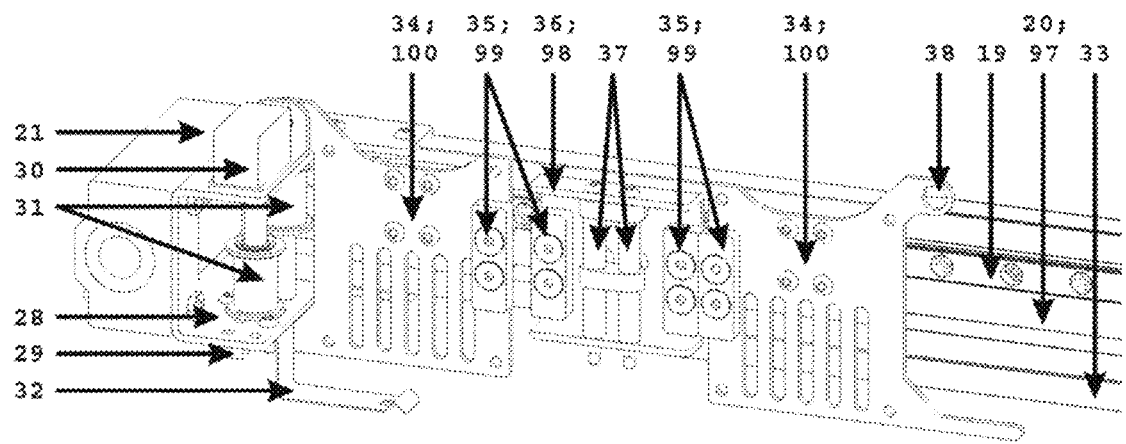
Fig. 5: Connection system (printing heads and toothed belts not shown)
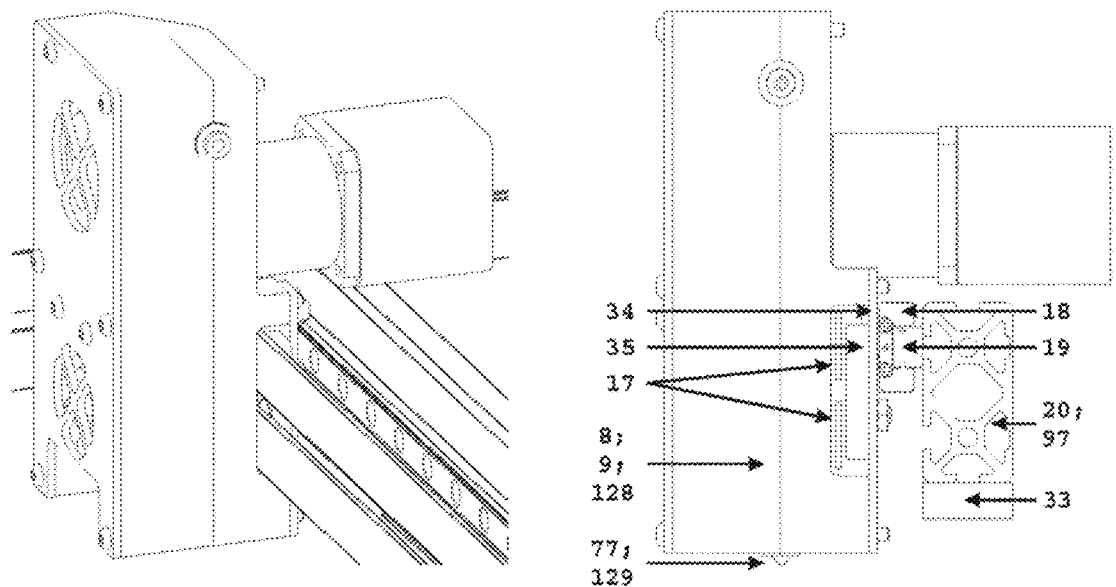
Fig. 6: Printing head mounting and guide system

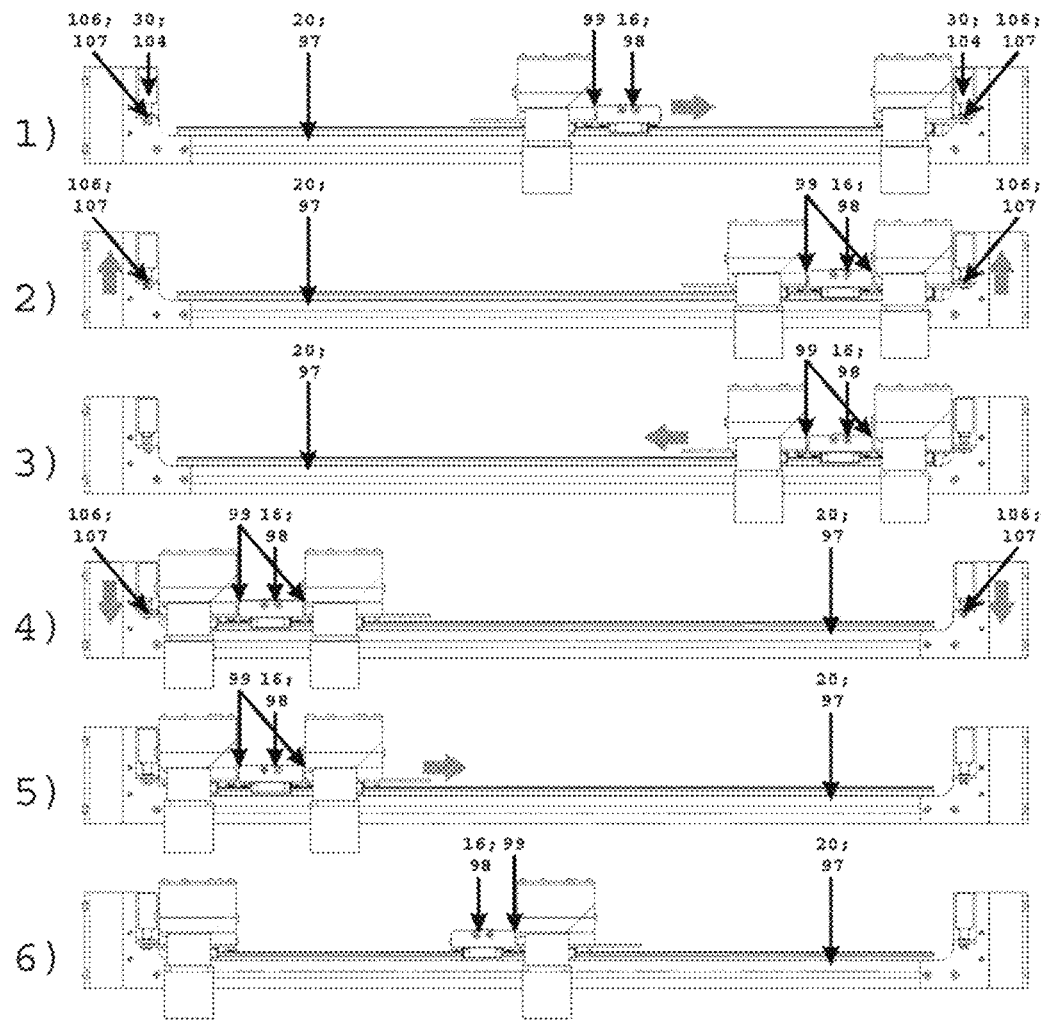
Fig. 7: Automatic printing head change

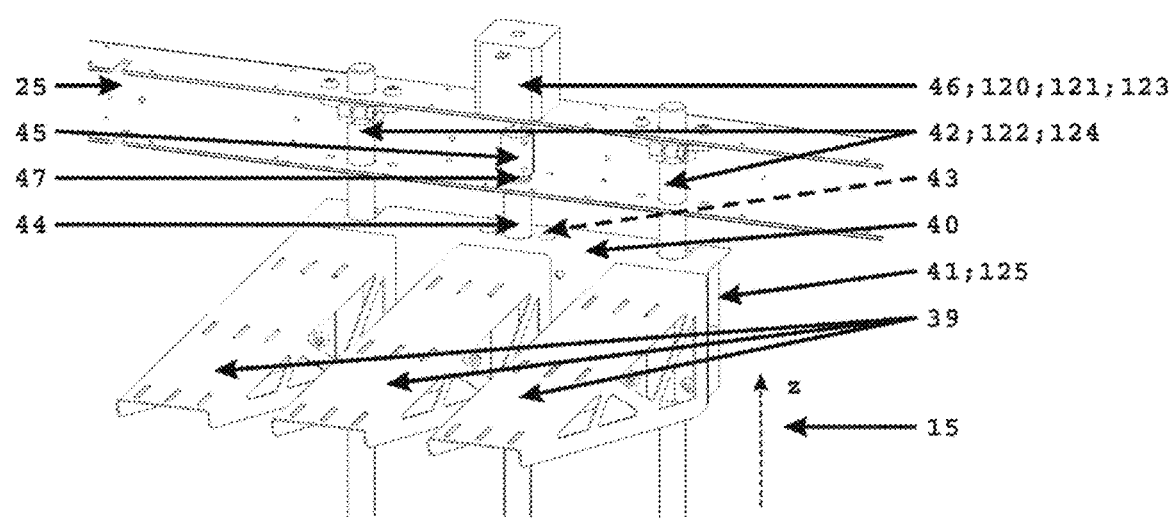
Fig. 8: Vertical positioning system (printing bed and printing platform not shown)
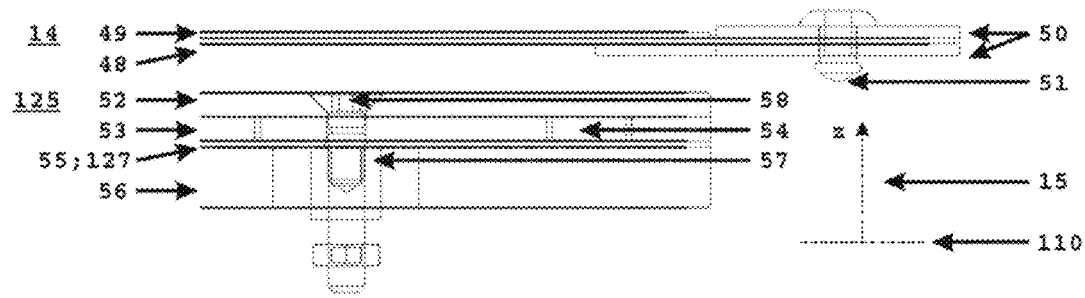
Fig. 9: Printing bed and printing platform

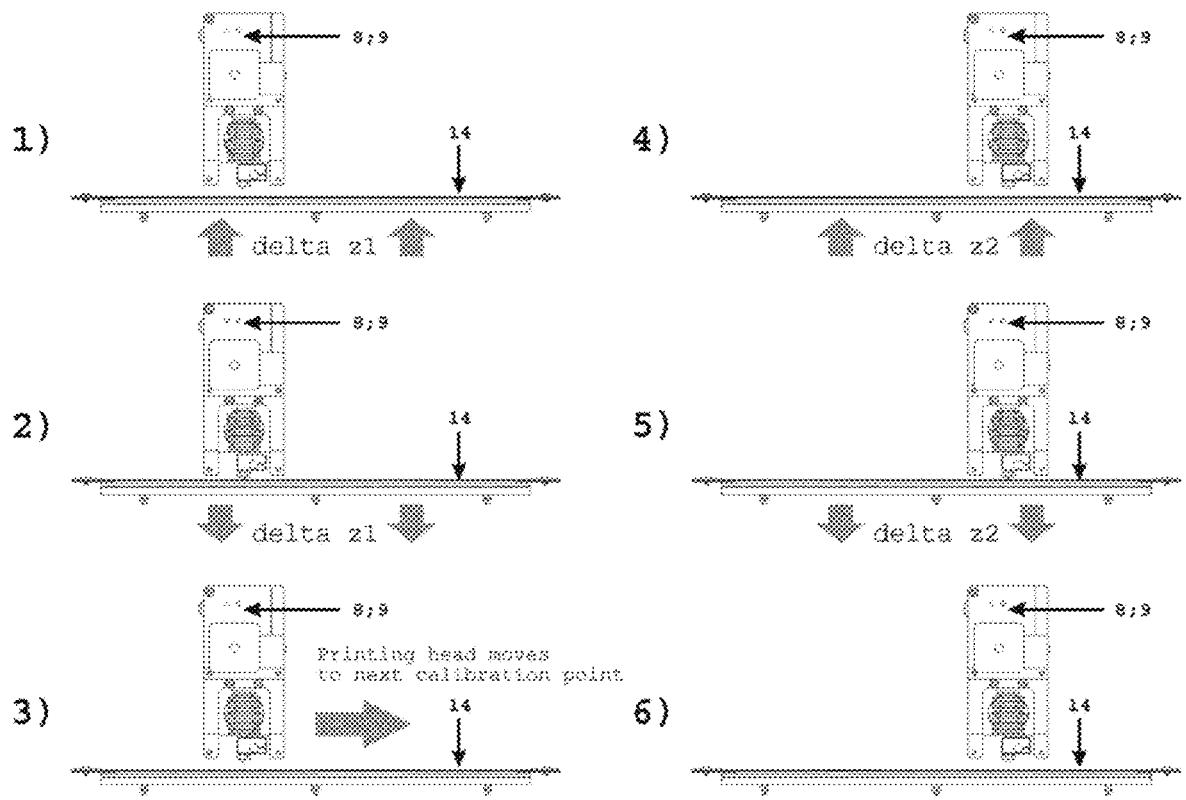
Fig. 10: Automatic printing bed calibration
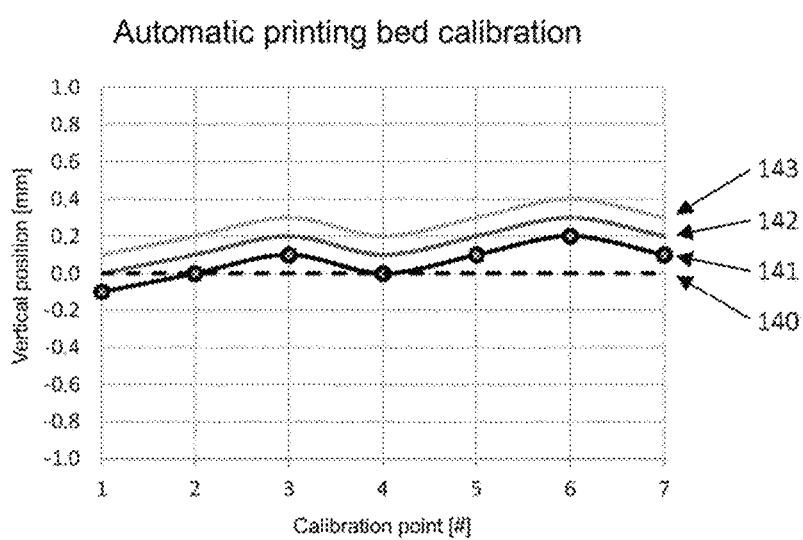
Fig. 11: Automatic printing bed calibration

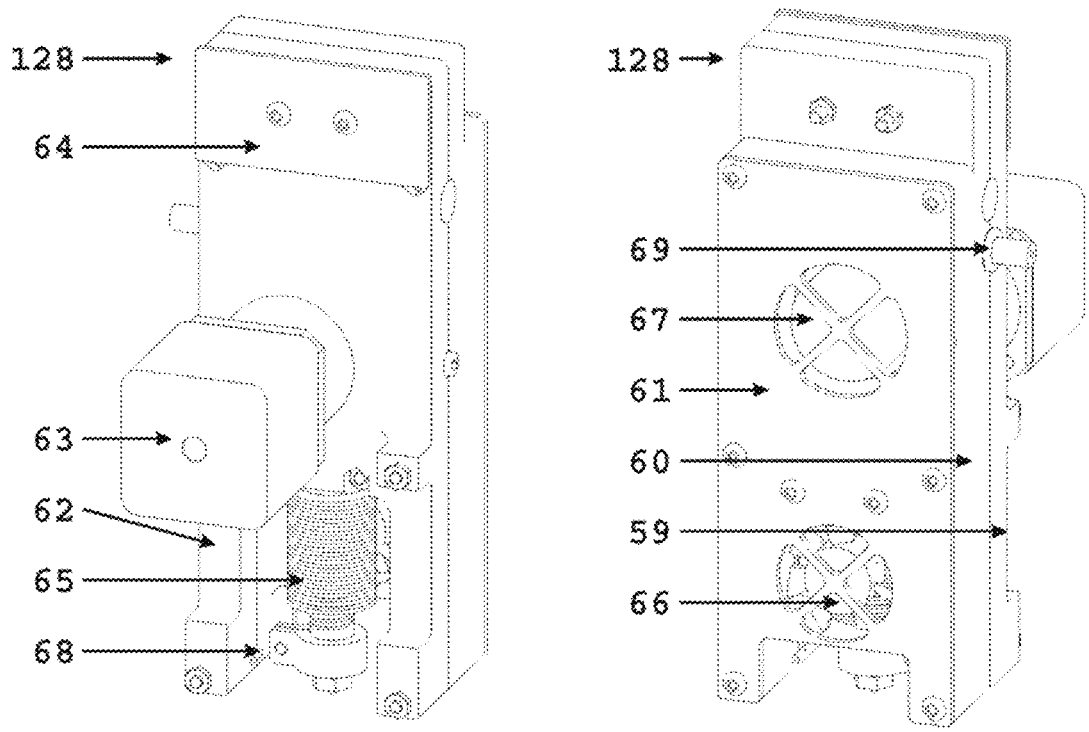
Fig. 12: Printing head (exterior view: front / back)
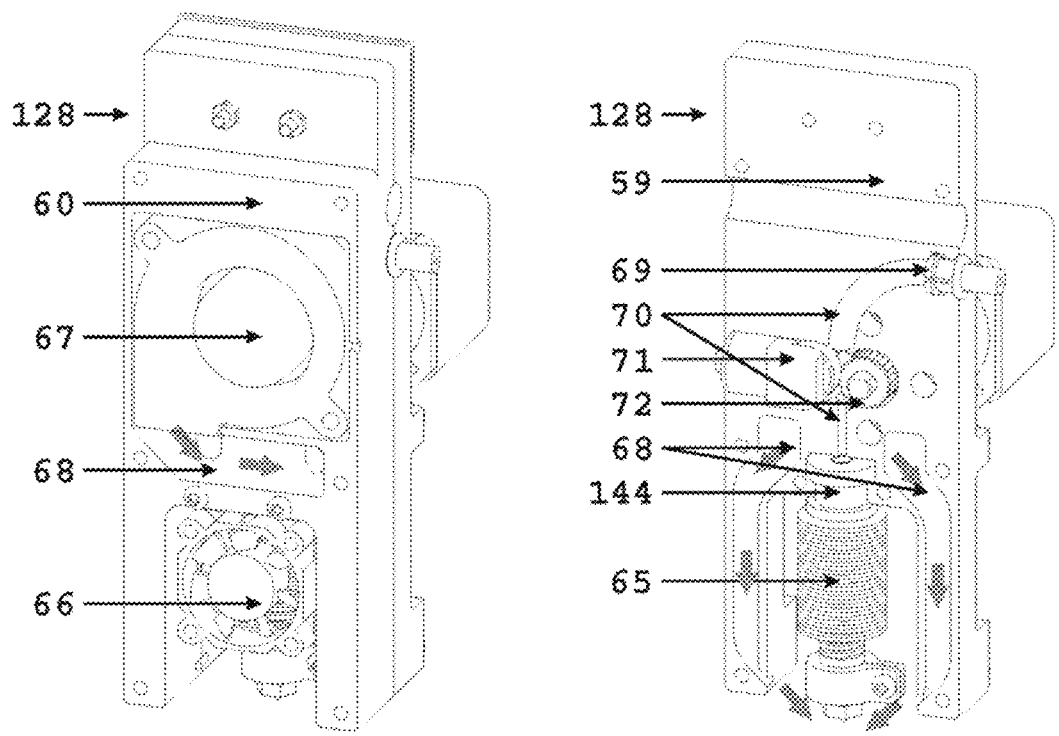
Fig. 13: Printing head (interior view: fans / material and air ducts)

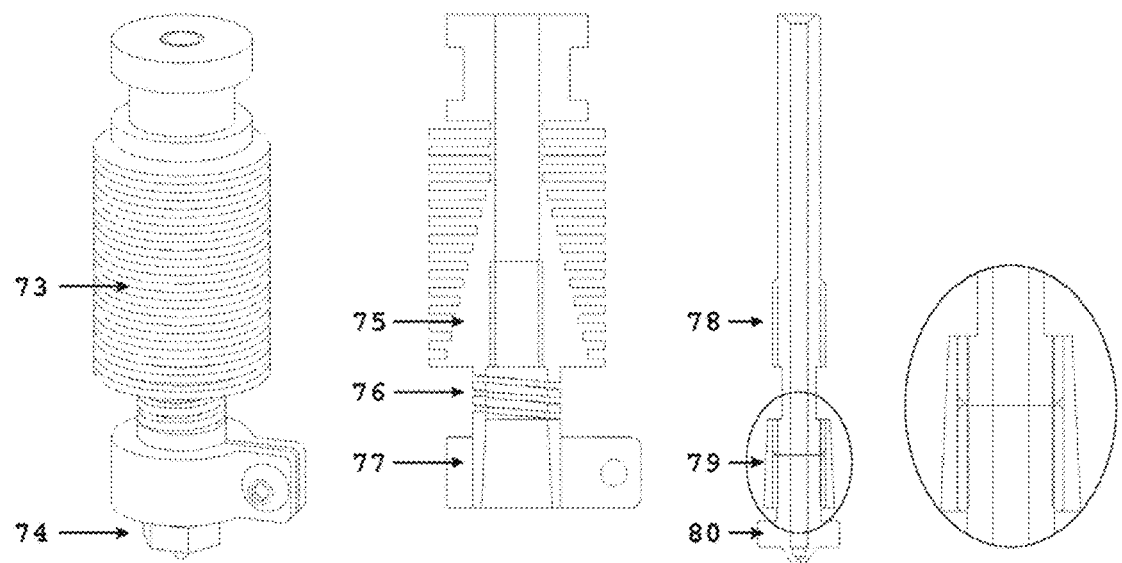
Fig. 14: Melting unit with heating unit and nozzle unit
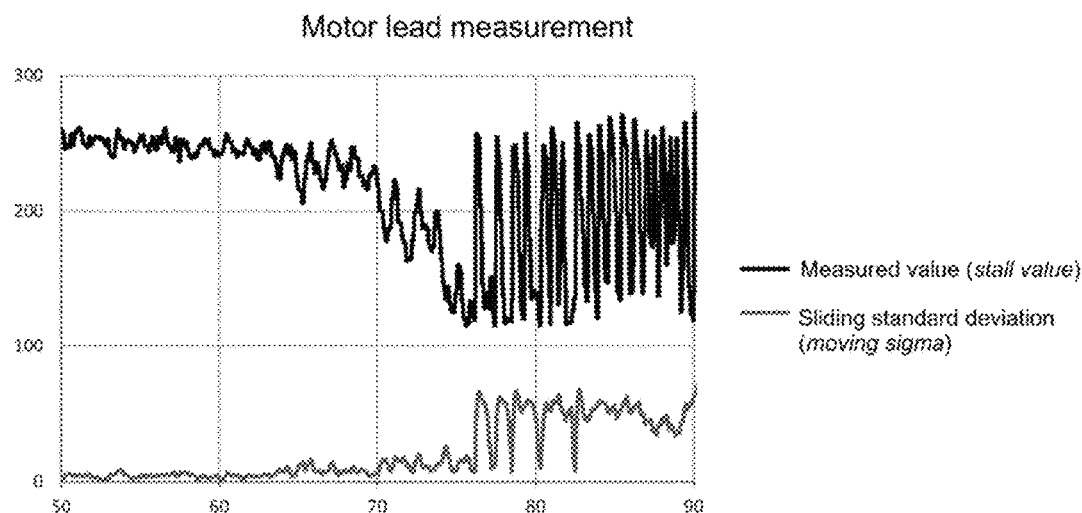
Fig. 15: Motor load measurement by means of reactive motor load (back EMF)

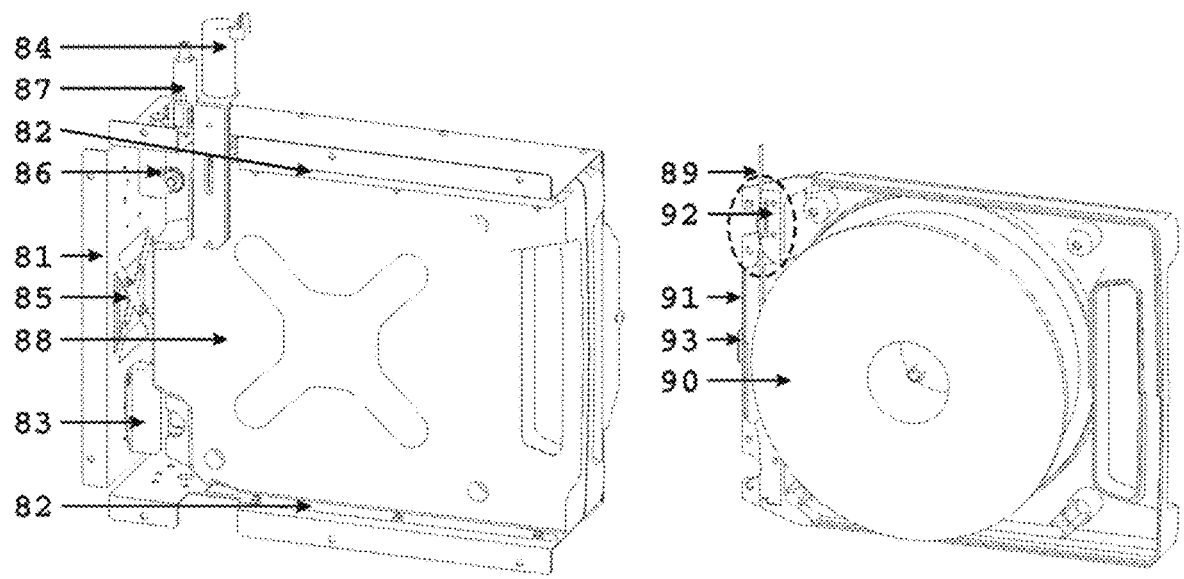
Fig. 16: Supply unit and material cartridge (interior view)
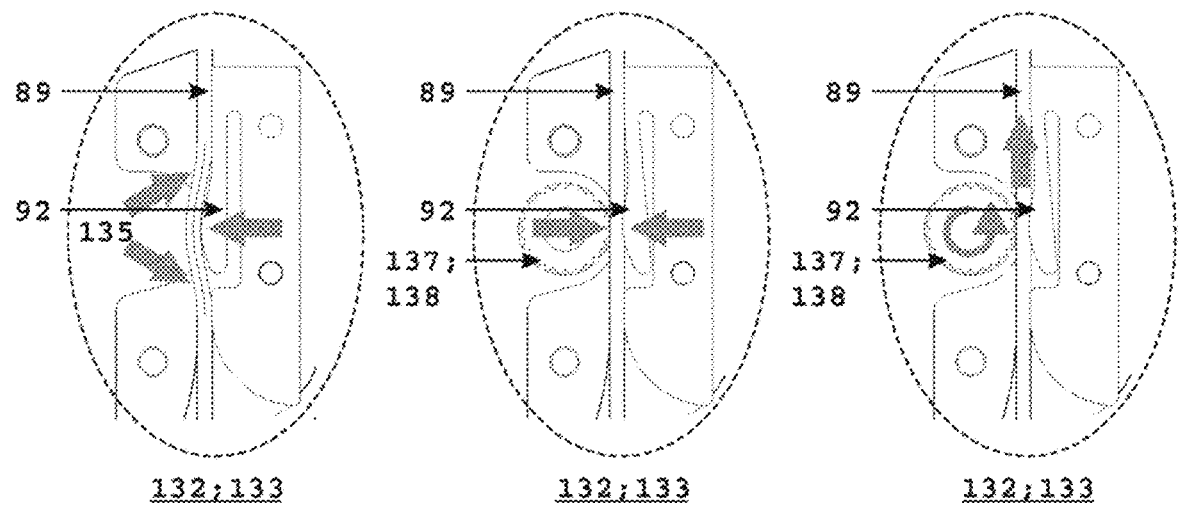
Fig. 17: Spring plate and feed unit (decoupled / coupled / with feed)

APPARATUS AND METHOD FOR FORMING A THREE-DIMENSIONAL OBJECT

The invention relates to an apparatus and a method for forming a dimensionally stable, three-dimensional object by consecutively or continuously applying and hardening a shapeable printing material.

The invention in particular relates to a 3D printer working according to the FFF method, i.e., according to the so-called fused filament fabrication method. With this type of 3D printer, a meltable printing material, in particular in the shape of a wire or in the shape of a filament, is melted in a printing head and shaped into a desired three-dimensional object by specifically applying and hardening it in multiple layers in the shape of dots and/or lines.

3D printers of a similar type are known and published in various embodiments. For example, filament printers are known, in which a heated nozzle can be moved in relation to a base in order to apply the melted printing material in the desired shape. These conventional apparatuses are disadvantageous in that only a single printing material can be applied during a continuous printing process. However, since a supporting structure may be necessary for more complex three-dimensional objects or since different printing materials may, where appropriate, be necessary for building the 3D object, there is a demand for 3D printers that can reshape at least two different printing materials during a continuous printing process. For solving this problem, so-called dual-head printers are known, in which two printing heads are loaded with two different printing materials, wherein both printing heads are always connected to the drive unit. These systems are disadvantageous in that the moving mass is significantly increased by the second printing head. As a result of the increased mass, stronger and thus larger drives are also required, which results in an additional increase of the mass. In particular, according to the prior art, the linear drives for moving the printing heads are arranged on moving components of the printer, whereby the mass to be moved is multiplied. This has a negative effect on the printing speed and on the printing accuracy of the 3D printer.

It is the task of the invention to overcome the disadvantages of the prior art. This includes in particular that the printer according to the invention is suitable for carrying out an efficient printing method.

The task according to the invention is achieved in particular by the feature combinations of the independent claims.

Where appropriate, the invention relates to an apparatus for forming a dimensionally stable, three-dimensional object by consecutively or continuously applying and hardening a shapeable printing material, in particular an FFF 3D printer, comprising:
  a base body acting as base for building the object,
  at least one printing head for applying the printing material,
  a moving apparatus for changing the relative position of the printing head in relation to the base body, and
  at least one printing material reservoir for accommodating the printing material and for supplying the printing material to the printing head.

Where appropriate, the invention relates to a method for forming a dimensionally stable, three-dimensional object by consecutively or continuously applying and hardening a shapeable printing material, in particular for forming a dimensionally stable, three-dimensional object by consecutively or continuously applying and hardening two shapeable printing materials, and in particular to a method for changing the printing head, comprising the following steps:
  moving the driving carriage and the first printing head coupled with the driving carriage via a coupling apparatus to a second printing head, which is in a parking position arranged in the end region of the first support element and locked in place there temporarily by a holding apparatus,
  coupling the second printing head with the driving carriage via the coupling apparatus so that the driving carriage is connected to both printing heads,
  releasing the holding apparatus of the second printing head so that the second printing head can be moved from its parking position,
  moving the driving carriage and the two printing heads coupled with the driving carriage via the coupling apparatus to the parking position of the first printing head at the opposite end region of the first support element,
  closing the holding apparatus of the first printing head and releasing the first printing head from the driving carriage by releasing the coupling apparatus so that the first printing head is locked in place in its parking position,
  moving the driving carriage and the second printing head coupled with the driving carriage via the coupling apparatus.

Where appropriate, the invention relates to a method for forming a dimensionally stable, three-dimensional object by consecutively or continuously applying and hardening a shapeable printing material, in particular for forming a dimensionally stable, three-dimensional object by consecutively or continuously applying and hardening two shapeable printing materials, and in particular to a method for changing the printing head, comprising the following steps:
  moving the driving carriage and the first printing head coupled with the driving carriage via a coupling apparatus to the parking position of the first printing head at the end region of the first support element, closing the holding apparatus of the first printing head and releasing the first printing head from the driving carriage by releasing the coupling apparatus so that the first printing head is locked in place in its parking position, moving the driving carriage to a second printing head which is in a parking position arranged in the opposite end region of the first support element and locked in place there temporarily by a holding apparatus, coupling the second printing head with the driving carriage via the coupling apparatus, releasing the holding apparatus of the second printing head so that the second printing head can be moved from its parking position, and moving the driving carriage and the second printing head coupled with the driving carriage via the coupling apparatus.

Where appropriate, the invention relates to a method for forming a dimensionally stable, three-dimensional object by consecutively or continuously applying and hardening a shapeable printing material, in particular to a method for calibrating an apparatus, wherein the apparatus is configured to form a dimensionally stable, three-dimensional object, wherein the object is in particular formed by consecutively or continuously applying and hardening a shapeable printing material, and wherein the apparatus comprises a base body acting as base for building the object, at least one printing head for applying the printing material, and a moving apparatus for changing the relative position of the printing head in relation to the base body, comprising the following steps:
  positioning a printing head along the xy-plane at a first calibration point,
  reducing the distance between the base body and the printing head until the base body touches a calibration reference element of the printing head,
  and detecting the contact between the base body and the calibration reference element.

In doing so, it can be advantageous if, during the calibration of the apparatus by means of one printing head, an additional printing head is arranged in its parking position, which is preferably located outside the printing region.

Where appropriate, the invention relates to a method for forming a dimensionally stable, three-dimensional object by consecutively or continuously applying and hardening a shapeable printing material, in particular to a method for monitoring the printing material transport, comprising the following steps:
  actuating a drive wheel of a printing material drive for conveying the printing material,
  measuring the reactive motor voltage of the printing material drive,
  comparing the reactive motor voltage with a desired value or a desired range, in particular comparing a sliding standard deviation of the reactive motor voltage with a desired value or a desired range,
  initiating an alternative operating mode or cleaning mode when the value or the sliding standard deviation of the reactive motor voltage deviates from the desired value or desired range.

Where appropriate, the invention relates to an apparatus for forming a dimensionally stable, three-dimensional object by consecutively or continuously applying and hardening a shapeable printing material, in particular an FFF 3D printer, comprising:
  a base body acting as base for building the object,
  at least one printing head for applying the printing material,
  a moving apparatus for changing the relative position of the printing head in relation to the base body, and
  at least one printing material reservoir for accommodating the printing material and for supplying the printing material to the printing head,
  wherein the moving apparatus comprises at least one elongated first support element extending along an x-axis,
  wherein a driving carriage connected or connectable to the printing head is linearly and in particular parallelly guided along the x-axis on the first support element, characterized in that
  two printing heads are provided,
  the driving carriage comprises a coupling apparatus,
  and the driving carriage can be coupled to the printing heads via the coupling apparatus and released from the printing heads,
  wherein the driving carriage is selectively coupled via the coupling apparatus to one printing head, with none of the printing heads, or to both printing heads.

Where appropriate, it is provided that the connection, established by the coupling apparatus, of the driving carriage to the printing head is a magnetic or a force-fit connection that can be disconnected in particular by overcoming the holding force of the coupling apparatus by moving the driving carriage along the x-axis.

Where appropriate, it is provided that the coupling apparatus comprises a magnetic or magnetizable body which is coupleable or coupled to an element of the printing head via magnetic forces.

Where appropriate, it is provided that the printing heads are each linearly guided along the x-axis on the first support element via a printing head carriage. Where appropriate, it is provided that the driving carriage is arranged along the extension of the first support element between the two printing head carriages of the two printing heads.

Where appropriate, it is provided that the first support element comprises a rail section in which the printing heads can be moved and positioned along the x-axis, and that, in the two end regions of the rail section or of the first support element, one holding apparatus each for temporarily fixing one printing head each and in particular one parking position each are provided.

Where appropriate, it is provided that the first support element comprises a rail section in which the printing heads can be moved and positioned along the x-axis, and that, in the two end regions of the rail section or of the first support element, one holding apparatus each for temporarily fixing one printing head each is provided, that the holding apparatuses each comprise a holding element, such as in particular a movable sliding bolt, and that the holding elements of the two holding apparatuses can be actuated simultaneously in a synchronized manner or in a manner mechanically coupled with each other,
or that the holding elements of the two holding apparatuses can be actuated independently of each other.

Where appropriate, it is provided that the apparatus is configured for forming a dimensionally stable, three-dimensional object by consecutively or continuously melting, specifically applying and hardening in multiple layers in the shape of dots and/or lines a meltable printing material in the shape of a wire or in the shape of a filament.

Where appropriate, it is provided that a machine frame is provided which is, where appropriate, surrounded or formed by a housing, and that a building space for forming the object is formed by the machine frame or by the housing.

Where appropriate, it is provided that the moving apparatus comprises at least one elongated first support element extending along the x-axis,
  that the moving apparatus comprises at least one elongated second support element extending along the y-axis,
  that the first support element is linearly and in particular parallelly guided along the y-axis on the second support element,
  that the second support element is connected to the machine frame in particular in a stationary or rigid manner,
  and that a driving carriage connected or connectable to the printing head is linearly and in particular parallelly guided along the x-axis on the first support element so that xy-kinematics for moving the printing head in an xy-plane are established.

Where appropriate, it is provided that the moving apparatus comprises a first drive belt, connected to the driving carriage, for moving the printing head, at least a first belt drive with a belt drive wheel for driving the drive belt, and a plurality of deflection sheaves for deflecting the drive belt,
  that the first belt drive is mounted on the machine frame in particular in a stationary manner,
  that at least one deflection sheave is mounted on the first support element and at least one deflection sheave is mounted on the machine frame, and that the first drive belt substantially runs in a first drive plane extending parallelly to the xy-plane.

Where appropriate, it is provided that the moving apparatus comprises a second drive belt, connected to the driving carriage, for moving the printing head, at least a second belt drive with a belt drive wheel for driving the drive belt, and a plurality of deflection sheaves for deflecting the drive belt,
that the second belt drive is mounted on the machine frame in particular in a stationary manner,
that at least one deflection sheave is mounted on the first support element and at least one deflection sheave is mounted on the machine frame,
and that the second drive belt substantially runs in a second drive plane extending parallelly and at a distance from the first drive plane and/or parallelly to the xy-plane.

Where appropriate, it is provided that the moving apparatus comprises two driven deflection sheaves for driving the drive belt for each drive belt,
or that the moving apparatus comprises two belt drives for driving the drive belt for each drive belt,
wherein the two driven deflection sheaves or the two belt drives of a drive belt are arranged over the course of the drive belt before and after the connection point or near the connection point(s) to the driving carriage, and that the two drives are in particular synchronized.

Where appropriate, it is provided that the moving apparatus comprises two belt drives or two driven deflection sheaves for driving the drive belt for each drive belt, wherein the two belt drives or the two driven deflection sheaves of a drive belt are each mounted on the machine frame in a corner position over the course of the drive belt immediately before and after the connection point to the driving carriage.

Where appropriate, it is provided that the moving apparatus comprises a base driving apparatus for moving and in particular parallelly moving the base body along the z-axis, wherein the base driving apparatus comprises a base drive and at least one guide element, wherein the base drive is designed as a linear drive and in particular as a step motor with a spindle and a spindle nut in effective contact with the ball screw, and wherein the guide element is designed as a linear guide and in particular as a bushing guided along a rail.

Where appropriate, it is provided that the moving apparatus comprises a base driving apparatus for moving and in particular parallelly moving the base body along the z-axis, wherein the base driving apparatus comprises a base drive and at least one guide element, wherein the base drive is designed as a linear drive and in particular as a step motor with a ball screw and a spindle nut in effective contact with the ball screw,
wherein the guide element is designed as a linear guide and in particular as a bushing guided along a rail,
and that a printing platform, designed as a cantilever, for holding the base body is provided and substantially extends normally to the movement direction of the base body, in particular in a plane parallel to the xy-plane, and which can be moved and driven along the z-axis via the base driving apparatus. Where appropriate, it is provided that the base body is designed as a removable printing bed and removably connected or connectable to the printing platform, and that the removable connection is in particular a magnetic connection. Where appropriate, it is provided that a heating apparatus for heating the base body is provided.

Where appropriate, it is provided that the printing head comprises a printing head main body and a nozzle arrangement, connected to the printing head main body at a connection point, for melting and applying the printing material, wherein the nozzle arrangement successively comprises, starting from the connection point, a cooling element, a decoupling point, and a heated or heatable nozzle. Where appropriate, it is provided that the printing head comprises a printing head main body and a nozzle arrangement, connected to the printing head main body at a connection point, for melting and applying the printing material, wherein the nozzle arrangement successively comprises, starting from the connection point, a cooling element, a decoupling point, and a heated or heatable nozzle, and that the decoupling point comprises a pipe for conducting the printing material, wherein the pipe is at least partially formed from a solid, heat-resistant material with a low thermal conductivity so that a thermal separation between the heated nozzle and the cooling element is provided by the pipe.

Where appropriate, it is provided that the printing head comprises a printing head main body and a nozzle arrangement, connected to the printing head main body at a connection point, for melting and applying the printing material, wherein the nozzle arrangement successively comprises, starting from the connection point, a cooling element, a decoupling point, and a heated or heatable nozzle, and that the decoupling point comprises a pipe for conducting the printing material, wherein the pipe is designed at least on the inside in a manner that is low-friction or substantially non-adhering with respect to the melted printing material.

Where appropriate, it is provided that the printing head comprises a printing head main body and a nozzle arrangement, connected to the printing head main body at a connection point, for melting and applying the printing material, wherein the nozzle arrangement successively comprises, starting from the connection point, a cooling element, a decoupling point, and a heated or heatable nozzle, and that the decoupling point comprises a pipe made of a metal alloy, a titanium alloy, or a stainless steel alloy, and/or that the inner surface of the pipe is polished, hardened, galvanized, and/or coated, wherein the inner surface is in particular polished and nitrated or provided with a PTFE coating.

Where appropriate, it is provided that the printing head comprises a printing head main body and a nozzle arrangement, connected to the printing head main body at a connection point, for melting and applying the printing material, wherein the nozzle arrangement successively comprises, starting from the connection point, a cooling element, a decoupling point, and a heated or heatable nozzle, and that the nozzle arrangement is separably connected or connectable to the printing head main body.

Where appropriate, it is provided that the printing material reservoir is designed as a changeable printing material reservoir which is modularly connected or connectable to the machine frame, wherein the connection is in particular carried out via a mounting apparatus and/or an insertion shaft.

Where appropriate, it is provided that the printing material reservoir comprises a clamping apparatus,
that the clamping apparatus has a clamping position in which a section of the printing material is clamped between a spring-preloaded spring element and a clamping jaw,
and that the clamping apparatus has a conveying position in which the clamping of the clamping apparatus is released sufficiently that a conveying of the printing material can take place.

Where appropriate, it is provided that the printing material reservoir comprises a clamping apparatus, that the clamping apparatus has a clamping position, in which a section of the printing material is clamped between a spring-preloaded spring element and a clamping jaw, that the clamping apparatus has a conveying position, in which the clamping of the clamping apparatus is released sufficiently that a conveying of the printing material can take place, and that the clamping apparatus changes automatically from the clamping position to the conveying position when the printing material reservoir is being or is connected to the apparatus. Where appropriate, it is provided that a printing material drive with a drive wheel for conveying the printing material from the printing material reservoir to the printing head is provided in a stationary manner on the machine frame, and that the drive wheel is in effective contact with a section of the printing material or directly abuts against a section of the printing material when the printing material reservoir is connected to the apparatus, so that by actuating the drive, a conveying of the printing material is being or is brought about.

Where appropriate, it is provided that a printing material drive with a drive wheel for conveying the printing material from the printing material reservoir to the printing head is provided in a stationary manner on the machine frame, and that the drive wheel is in effective contact with a section of the printing material or directly abuts against a section of the printing material when the printing material reservoir is connected to the apparatus, so that by actuating the drive, a conveying of the printing material is being or is brought about, and that, in doing so, the section of the printing material is clamped between the drive wheel and the spring-preloaded spring element so that the friction between the drive wheel and the printing material is increased in order to improve conveyance. Where appropriate, it is provided that a printing material drive with a drive wheel for conveying the printing material from the printing material reservoir to the printing head is provided in a stationary manner on the machine frame, and that the drive wheel is in effective contact with a section of the printing material or directly abuts against a section of the printing material when the printing material reservoir is connected to the apparatus, so that by actuating the drive, a conveying of the printing material is being or is brought about, and that the printing material drive and the drive wheel remain in the machine frame when the printing material reservoir is removed.

Where appropriate, it is provided that the printing material reservoir is connectable or releasably connected to the machine frame by means of a mounting apparatus designed in particular as an insertion shaft provided on the machine frame.

Where appropriate, it is provided that the printing material reservoir comprises a non-contact transmission device, in particular an RFID chip, which can be read and/or written on by a non-contact transmission device, in particular an RFID unit, when the printing material reservoir is in the inserted position, wherein a non-contact transmission device, in particular the RFID unit, is connected to the data processing device, and wherein a non-contact transmission device, in particular the RFID unit, is mounted on the mounting apparatus, on the insertion shaft, or on the machine frame.

Where appropriate, it is provided that the printing material reservoir comprises a non-contact transmission device, in particular an RFID chip, which can be read and/or written on by a non-contact transmission device, in particular an RFID unit, and that, in doing so, data of the printing material reservoir, such as serial number, material type, expiration date, security code, remaining material quantity, which is in particular updated after each use, and/or material-dependent parameters, such as the optimal printing temperature or the optimal printing speed, are transmitted. Where appropriate, it is provided that two printing material reservoirs are provided, which are respectively connected to a printing head via a printing material line.

Where appropriate, the invention relates to a method for forming a dimensionally stable, three-dimensional object by consecutively or continuously applying and hardening a shapeable printing material, in particular for forming a dimensionally stable, three-dimensional object by consecutively or continuously applying and hardening two shapeable printing materials, and in particular to a method for changing the printing head, comprising the following steps:

moving the driving carriage and the first printing head coupled with the driving carriage via a coupling apparatus, moving the driving carriage to a second printing head which is in a parking position arranged in the end region of the first support element and locked in place there temporarily by a holding apparatus, coupling the second printing head with the driving carriage via the coupling apparatus, releasing the holding apparatus of the second printing head so that the second printing head can be moved from its parking position, wherein, before the coupling of the second printing head with the driving carriage or after the coupling of the second printing head with the driving carriage, the driving carriage and the first printing head coupled with the driving carriage via a coupling apparatus are moved to the parking position of the first printing head, the holding apparatus of the first printing head is closed there, and the first printing head is released from the driving carriage so that the first printing head is locked in place in its parking position, wherein, after the printing head change, only the second printing head is connected to the driving carriage.

Where appropriate, the method comprises the following steps:

moving the driving carriage and the first printing head coupled with the driving carriage via a coupling apparatus to a second printing head, which is in a parking position arranged in the end region of the first support element and locked in place there temporarily by a holding apparatus, coupling the second printing head with the driving carriage via the coupling apparatus so that the driving carriage is connected to both printing heads, releasing the holding apparatus of the second printing head so that the second printing head can be moved from its parking position, moving the driving carriage and the two printing heads coupled with the driving carriage via the coupling apparatus to the parking position of the first printing head at the opposite end region of the first support element, closing the holding apparatus of the first printing head and releasing the first printing head from the driving carriage by releasing the coupling apparatus so that the first printing head is locked in place in its parking position, moving the driving carriage and the second printing head coupled with the driving carriage via the coupling apparatus.

Where appropriate, it is provided that the holding apparatus of the first printing head and the holding apparatus of the second printing head are released or closed simultaneously, in a synchronized manner or in a manner coupled with each other.

Where appropriate, it is provided that, in order to lock a printing head in place in the parking position, the printing head is moved into the respective end region of the first support element, the respective holding apparatus is then closed, and the coupling apparatus is then disconnected by moving the driving carriage away and by overcoming the holding force.

Where appropriate, the invention relates to a method, in particular to a method for calibrating an apparatus according to the invention, wherein the apparatus is configured to form a dimensionally stable, three-dimensional object, wherein the object is in particular formed by consecutively or continuously applying and hardening a shapeable printing material, and wherein the apparatus comprises a base body acting as base for building the object, at least one printing head for applying the printing material, and a moving apparatus for changing the relative position of the printing head in relation to the base body, comprising the following steps:

positioning a printing head along the xy-plane at a first calibration point, reducing the distance between the base body and the printing head until the base body touches a calibration reference element of the printing head, and detecting the contact between the base body and the calibration reference element.

Where appropriate, it is provided that, after detecting the contact between the base body and the calibration reference element at the first calibration point, a distance is established between the base body and the calibration reference element.

Where appropriate, it is provided that, after re-establishing a distance between the base body and the calibration reference element, the printing head is moved to a second calibration point, wherein the second calibration point has a distance from the first calibration point in the xy-plane, that the distance between the base body and the printing head is subsequently reduced until the base body touches the calibration reference element of the printing head and a detection of the contact between the base body and the calibration reference element takes place, and that, after detecting the contact between the base body and the calibration reference element at the second calibration point, a distance is established again between the base body and the calibration reference element.

Where appropriate, it is provided that, after re-establishing a distance between the base body and the calibration reference element, the printing head is moved to an additional, in particular third, calibration point, wherein the additional calibration point has a distance from the already approached calibration points in the xy-plane, that the distance between the base body and the printing head is subsequently reduced until the base body touches the calibration reference element of the printing head, and a detection of the contact between the base body and the calibration reference element takes place, and that, after detecting the contact between the base body and the calibration reference element at the additional calibration point, a distance is established between the base body and the calibration reference element.

Where appropriate, it is provided that at least three calibration points are approached successively until a contact between the base body and the calibration reference element is detected, and that relative or absolute position data, in particular the x-, y-, and z-values of the contact points or the height differences of the contact points along the z-axis, are transmitted to a data processing device.

Where appropriate, it is provided that a plurality of calibration points arranged in a plane, in a grid shape, or in a chessboard pattern along the base body are approached successively until a contact between the base body and the calibration reference element is respectively detected, and that relative or absolute position data, in particular the x-, y-, and z-values of the contact points or the height differences of the contact points along the z-axis, are transmitted to a data processing device.

Where appropriate, it is provided that the x-, y-, and z-values of the contact points or the height differences of the contact points along the z-axis are transmitted to a data processing device, and that the data processing device determines a calibration matrix or a calibration surface, which substantially corresponds to a mathematical model or an approximated mathematical model of the surface of the base body.

Where appropriate, it is provided that each calibration point is approached several times, in particular three times, that the position data of a calibration point recorded in the process are compared to each other, and that the calibration point is approached at least one more time if the recorded position data, in particular the z-values of the position data, deviate from each other by a value that exceeds a predetermined maximum deviation value.

Where appropriate, it is provided that two printing heads are provided, that, after approaching the calibration points with the first printing head, a printing head change is carried out so that the second printing head is exclusively coupled with the driving carriage, that any calibration point already approached with the first printing head, in particular a single arbitrary calibration point already approached with the first printing head, is subsequently also approached with the second printing head, and that a z-difference value to the corresponding value of the first printing head is calculated from the recorded position data of the second printing head. Where appropriate, it is provided that the calibration surface or the calibration matrix of the second printing head is calculated by mathematically shifting the calibration matrix of the first printing head by the z-difference value, wherein the shifting of the calibration matrix is calculated in particular by vector addition.

Where appropriate, it is provided that, in order to form a three-dimensional object, the printing head is moved along the calibration surface or parallelly to the calibration surface during a movement in the xy-plane in order to keep constant the distance between the base body and the nozzle tip in particular during the printing process.

Where appropriate, it is provided that, when forming an object, the z-position of the base body is adapted dynamically depending on the xy-position of the printing head so that the nozzle of the printing head has the same distance from the printing surface or from the printed object in every printing position, or the difference is compensated step by step.

Where appropriate, it is provided that an oblique position of the printed object, in consequence of an obliquely arranged base body, is compensated during the printing process by a horizontal displacement of the individual layers.

Where appropriate, it is provided that the calibration takes place automatically or in an automated manner, wherein the automation is carried out in particular in a program-controlled manner by a data processing device.

Where appropriate, it is provided that the calibration reference element is the tip of the nozzle of the printing head, an element provided at the tip of the nozzle, or an element forming the tip of the nozzle.

Where appropriate, it is provided that, for the relative movement between the base body and the printing head, the base is moved along the z-axis, wherein the movement takes place by actuating the base driving apparatus.

Where appropriate, the invention relates to a method for forming a dimensionally stable, three-dimensional object by consecutively or continuously applying and hardening a shapeable printing material, in particular to a method for monitoring the printing material transport, comprising the following steps:

actuating a drive wheel of a printing material drive for conveying the printing material, measuring the reactive motor voltage of the printing material drive, comparing the reactive motor voltage with a desired value or a desired range, in particular comparing a sliding standard deviation of the reactive motor voltage with a desired value or a desired range, initiating an alternative operating mode or cleaning mode when the value or the sliding standard deviation of the reactive motor voltage deviates from the desired value or desired range.

In doing so, it can be advantageous if, during the calibration of the apparatus by means of one printing head, an additional printing head is arranged in its parking position, wherein the parking position is preferably located outside the printing region.

Where appropriate, it is provided that a machine frame and/or housing arranged or arrangeable in a stationary manner is provided. It is preferably provided that a moving apparatus in provided, which allows for a relative movement of a printing head in relation to a base along several degrees of freedom so that a three-dimensional object can be built. The degrees of freedom are preferably three linear degrees of freedom, in particular degrees of freedom along a Cartesian coordinate system with an x-, y-, and z-axis. According to the definition, the xy-plane can extend substantially horizontally in all embodiments. According to the definition, the z-axis can be a normal vector of the xy-plane in all embodiments.

For moving the printing head along the x-axis, an elongated first support element is preferably provided which extends in the shape of a profile along the x-axis. The printing head can preferably be moved by moving a driving carriage guided along the longitudinal extent direction of a first support element. Where appropriate, it is provided that the driving carriage and/or the first support element comprise guide grooves and/or guide extensions so that a rail-type guide, in particular a rail-type guide with an undercut and only one linear degree of freedom, is formed.

Where appropriate, it is provided that the first support element is guided along the y-axis. Where appropriate, a second support element is provided to this end, which second support element extends in the manner of a rail or in the shape of a profile along or parallelly to the y-axis. Where appropriate, two second support elements are provided which guide the first support element at its end sections or in the region of these end sections. The second support element is always connected to the machine frame preferably in a substantially rigid or stationary manner. It is preferably provided that the second support element extends substantially normally to the first support element so that in particular xy-kinematics are established.

In order to drive the movement of the printing head, at last one drive belt is, where appropriate, provided, wherein two drive belts are preferably provided. Less than three drive belts are particularly preferably provided in order to drive the printing head or the driving carriage along the xy-plane. Where appropriate, it is provided that the drive belt(s) is/are designed as circumferential, where appropriate closed drive belts, wherein the drive belt(s) comprise(s) two ends connected to each other, where appropriate. For example, the two ends are connected to the driving carriage. Where appropriate, a drive belt is or both drive belts is/are designed as toothed belts in all embodiments.

The first drive belt is preferably connected to or coupled with the driving carriage and runs in particular:

from the driving carriage along the longitudinal extent direction of the first support element to a deflection sheave arranged on the end region of the first support element; from this deflection sheave further to a deflection sheave provided on the machine frame in an end region of a second support element; from there further to a deflection sheave provided in an end region of the other second support element; from there along this second support element past the first support element to another deflection sheave where the belt is deflected substantially 180°; from there along the second support element to a deflection sheave provided on the closer end region of the first support element; and from there again to the driving carriage so that a closed, circulating drive belt is formed. The axes of rotation of the deflection sheaves extend substantially parallelly to each other. At least one of the deflection sheaves is in particular designed as a belt drive wheel of a belt drive. It is preferably provided that a deflection sheave mounted on the machine frame is designed as a belt drive roll. It is preferably provided that the deflection sheaves arranged along the drive belt closest to the driving carriage on the machine frame are designed as belt drive wheels. Where appropriate, two deflection sheaves are accordingly designed as a belt drive roll of one belt drive each. The drives are preferably mounted on the machine frame in a stationary manner.

It is preferably provided that the first drive belt runs substantially along a plane parallel to the xy-plane.

A second drive belt is preferably provided. The configuration of the second drive belt and its drives and/or deflection sheaves is preferably designed the same as the configuration of the first drive belt, wherein the configuration is a mirrored configuration with respect to the first drive belt. The configuration of the second drive belt is in particular mirrored with respect to the configuration of the first drive belt at a plane in which the z-axis is located. The mirror plane is in particular a yz-plane extending centrally. The second drive belt preferably runs in a plane parallelly offset from the plane of the first drive belt by a certain distance along the z-axis.

It is preferably provided that by actuating the belt drive of the first drive belt and by actuating the belt drive of the second drive belt, the driving carriage can be moved into any position along the x-axis and/or along the first support element. In addition, by actuating the two belt drives, the first support element can be moved along the second support element, whereby the driving carriage and, where appropriate, the printing head can be moved along any contour within the bounds of the kinematics in the xy-plane to any position. This configuration is advantageous in that the drives for moving the printing head can be arranged in a stationary manner on the machine frame, and that only comparatively lightweight components, such as a deflection sheave or a belt, are provided as moving mass.

Where appropriate, two printing heads are provided, wherein the two printing heads are preferably arranged movably along the x-axis on the first support element. Where appropriate, it is provided that a driving carriage movable and drivable along the first support element comprises a coupling apparatus, wherein the coupling apparatus can preferably be coupled with one of the printing heads or with both printing heads and/or be released from the printing heads. Where appropriate, the printing heads themselves are each linearly guided along the x-axis on the first support element on their own printing head carriage. Where appropriate, the guiding of one or both printing heads takes place via the driving carriage. In this case, the printing heads can be arranged at a distance from the first support element, wherein the coupling and guiding on the first support element takes place exclusively via the driving carriage.

Where appropriate, the coupling apparatus comprises a magnetic and/or magnetizable body. The printing head can in particular be temporarily attached to the driving carriage via magnetic forces. Both printing heads can optionally be coupled with the driving carriage or the coupling apparatus via at least one magnet or magnetizable body each.

Where appropriate, it is provided that one parking position for a printing head is set up in the two end regions of the first support element. The parking positions preferably each comprise a holding apparatus for temporarily fixing the respective printing head. The holding apparatus in particular comprises a holding element, such as a movable sliding bolt, a retractable bolt, a magnetic element, or similar, by means of which the printing head can be locked in place or held in the parking position. Where appropriate, it is provided that the holding force of the holding apparatus is larger than the holding force of the coupling apparatus so that the coupling apparatus and thus the printing head disconnects from the driving carriage when the driving carriage is moved away from the parking position when the holding apparatus is closed. The coupling apparatus can in particular be or comprise a force-fit clamping connection or a magnetic connection, wherein the holding apparatus can, where appropriate, establish a form-fit connection.

For example, for disconnecting, an apparatus on the back wall of the printing region could be used, which is approached during a printing head change, disconnects the magnets between the printing head and the driving carriage from each other, and pushes the printing head toward a somewhat weaker magnet which fixes the printing head in its parking position. During re-connecting, the two stronger magnets between the printing head and the driving carriage connect, and the two weaker magnets between the printing head and the parking position are pulled apart as soon as the driving carriage moves toward the printing region again.

The component referred to as the mounting apparatus or locking unit in the description fulfills, where appropriate, two tasks which do not necessarily have to be fulfilled by the same component, namely locking the material cartridge in place in the correct position in order to release the printing material from the clamping position and to produce the correct counter pressure for the material feed, locking the material cartridge in the insertion shaft until it is rewound and released in order to avoid that a portion of the printing material breaks off and remains in the printer during an early removal. Where appropriate, a spring-loaded sliding bolt is located on the front side of the material cartridge, which sliding bolt catches when the material cartridge is inserted, and which must be pushed down when the material cartridge is to be removed again. In order to prevent an early removal, a locking unit can be used, which in this case does however not have the task of providing the counter-force for the clamping position and the material feed so that, as a result of the lower friction occurring when opening the lock, a significantly weaker pulling magnet can be used.

Where appropriate, it is provided that the two holding apparatuses can be opened or closed simultaneously, synchronized or coupled.

In order to change the printing head, the procedure can in particular be as follows:

A first printing head is connected to the driving carriage via the coupling apparatus. Subsequently, the driving carriage moves together with the first printing head to the parking position of the second printing head, where the second printing head is held and/or locked in place by the holding apparatus. Subsequently, a coupling of the second printing head with the driving carriage via the coupling apparatus comes about. Then, the holding apparatus of the second printing head is opened. Where appropriate, both holding apparatuses of both parking positions are opened in the process. Subsequently, the driving carriage, which is coupled with both printing heads, moves toward the parking position of the first printing head. If the first printing head is in its parking position, the holding apparatus of the first printing head is closed, whereby the first printing head is locked in place in its parking position. Where appropriate, the holding apparatus of the second printing head is also closed in the process. However, since the second printing head in the present position is not in its parking position, the second printing head is not locked in place. Subsequently, the coupling apparatus between the driving carriage and the first printing head is disconnected, and the driving carriage is only still coupled with the second printing head. In order to change the printing head again, this process is repeated for the other printing head in a logically adapted manner. Where appropriate, it is provided that the driving carriage can be coupled along the x-axis on both sides with one printing head each. Given the changeability, an object can advantageously be built during the printing process selectively with the first printing head or with the second printing head, without the moving mass being increased during the printing process as a result.

Where appropriate, a parking position can be provided in all embodiments on the machine frame in a rigid or stationary manner. Where appropriate, two printing heads can be provided with one parking position each, wherein two parking positions are preferably provided in a rigid or stationary manner on the machine frame; the parking position can, for example, be arranged in the region of the back wall of the housing.

Where appropriate, a parking position can be provided in all embodiments on a support element, preferably on the first support element and particularly preferably in an end region of the first support element. Where appropriate, two printing heads can be provided with one parking position each, wherein both parking positions are preferably provided on a support element, preferably on the first support element and particularly preferably in one end region each of the first support element.

In order to build three-dimensional objects, a printing material is applied and hardened consecutively or continuously, wherein a relative movement along the z-axis also takes place in addition to the movability of the printing head in the xy-plane in order to in particular allow for a building of the object along the z-axis.

Where appropriate, it is provided that the moving apparatus comprises a base driving apparatus for moving and in particular parallelly moving the base along the z-axis.

The base preferably comprises a straight, level surface which extends substantially parallelly to the xy-plane and on which the object can be built. Where appropriate, the base however comprises a certain structure or a curved or complex surface. The base driving apparatus comprises, for example, guide elements configured for moving the base parallelly. The base driving apparatus preferably comprises a drive, in particular a linear drive, by means of which the base can be moved along the z-axis.

According to a preferred embodiment, the three-dimensional body to be formed is built in a layered shape. The first layer substantially follows the surface of the base body and in particular the surface of the base body facing the printing head. Since the surface of the base body is curved, where appropriate, or extends not precisely parallelly to the xy-plane as a result of tolerances, there is the risk that the distance between the nozzle tip and the base body varies when moving the printing head along the xy-direction and in particular is too large or too small, whereby the precision in building the object is impaired. For this reason, a calibration is preferably carried out.

Where appropriate, it is provided in all embodiments that this calibration takes place automatically or in an automated manner. The automation can, for example, be carried out in a program-controlled manner, in particular in a program-controlled manner by means of a data processing device. Where appropriate, it is provided that the printing head is provided with a calibration reference element. This calibration reference element allows for the exact determination of the surface of the base body in relation to the nozzle tip. The calibration reference element is preferably the tip of the nozzle of the printing head, an element provided at the tip of the nozzle, or an element forming the tip of the nozzle. By using the nozzle tip as a calibration reference element, a precise calibration of the position in relation to the base body is possible.

For calibration, preferably a plurality of calibration points along the xy-plane are now approached, wherein the individual calibration points are at a distance from each other and preferably distributed in a plane and/or in a grid shape along the course of the base body. Each of the calibration points is individually approached for calibration. This means that the printing head is moved in a first step at a distance from the base body to the desired xy-position of the calibration point. In a next step, the distance between the printing head, or the calibration reference element, and the base body is reduced until a contact of these components comes about. This contact is, for example, detected by an acceleration sensor and/or by detection of an increased motor load of the base body drive. Subsequently, the movement is stopped, and the base body is once again brought to a certain distance from the calibration reference element. Subsequently, the printing head and thus also the calibration reference element are brought to a second calibration position, where the preceding steps are repeated. These steps can be carried out at a plurality of calibration points, preferably at more than two calibration points, and in particular at a plurality of calibration points distributed along the base body in a grid shape. At each calibration point, the xy-position data on the one hand and the position data that allow for conclusions about the height differences of the contact points along the z-axis are transmitted to a data processing device. In this data processing device, a calibration matrix or a calibration surface, which substantially corresponds to a mathematical model of the surface of the base body, can be calculated based on the individual coordinates and their z-positions.

Where appropriate, two or more printing heads are provided on the apparatus. In order to also carry out a calibration with respect to the second or additional printing head, a printing head change is carried out so that the second printing head is exclusively coupled with the driving carriage. Subsequently, any calibration point already approached with the first printing head is also approached by the second printing head. From the data obtained in the process, a z-difference of the calibration between the first and the second printing head can be calculated. For example, the nozzle of the second printing head is slightly shorter than the nozzle of the first printing head so that a difference of the distance between the nozzle tip and the base body results. By reading this z-difference for a single calibration point, the entire calibration matrix can also be calculated for the second printing head, for example by vector addition of the z-difference. Where appropriate, an additional calibration point is also approached however by the second or additional printing head in order to verify the shifting of the calibration surface, where appropriate.

In order to form a three-dimensional object, the printing head can now be moved along the xy-plane along the desired contour. In order to keep the distance between the base body and the nozzle tip constant, a constant distance can be maintained via the base body drive and the stored mathematical model of the calibration surface during an xy-movement of the printing head. The subsequent layers can also be applied along the calibration surface, or along a surface offset from the calibration surface by the layer thickness.

Where appropriate, in the case of an oblique position of the surface of the base body, the entire object can be built along the normal vector of this obliquely positioned surface; this normal vector then generally deviates from the direction of the z-axis.

Where appropriate, an unevenness and/or an oblique position of the surface of the base body can also be compensated or leveled by applying a printing material or a support structure. This leveling can, for example, be built by the first printing layers. The leveling can in particular be part of the printing process. In this case, the object can be built along the z-axis even in case of an oblique position of the surface of the base body.

Where appropriate, the invention relates to a printing head for forming a dimensionally stable, three-dimensional object by consecutively or continuously applying and hardening a shapeable printing material. A printing material in the shape of a wire or in the shape of a filament is in particular supplied to the printing head. Where appropriate, the printing head comprises a printing head main body and a nozzle arrangement.

Where appropriate, it is provided that a drive with a drive wheel for conveying the printing material is provided on the printing head main body. The printing material is preferably guided via a tubular connecting line from the printing material into the printing head. Where appropriate, it is provided that the printing head comprises at least one fan. The fan is preferably connected or fluidically connected to one or more ventilation ducts. The outlets of the ventilation duct are preferably directed toward the printing point so that the printing material applied in the melted condition is cooled by the air cooling and thereby hardened. Where appropriate, a fan is provided, which cools parts of a nozzle arrangement, in particular a cooling element of the nozzle arrangement, by artificial convection or removes its heat. Where appropriate, the fan for cooling the nozzle arrangement is the same fan as the fan for cooling the applied printing material.

Where appropriate, it is provided that, starting from a connection point of the nozzle arrangement to the printing head main body, a cooling element, a decoupling point, and a heated or heatable nozzle are provided successively. These three elements protrude freely from the connection point to the printing head main body, where appropriate. It is in particular advantageous if the hot nozzle is arranged in a manner thermally insulated or isolated from the rest of the components of the printing head to the greatest extent possible. To this end, a thermal decoupling point can be provided between the cooling element and the nozzle. This thermal decoupling point can, for example, be formed by an element that has a low thermal conductivity coefficient, whereby an insulation is given. In particular, the thermal conduction between the hot nozzle and the cooling element is to be reduced or minimized. At the same time, the transition zone, in which the printing material transitions from the solid to a shapeable, melted condition, is to be kept as short as possible, where appropriate. For this reason, it is advantageous to provide a sufficient thermal decoupling. The cooling element is in particular configured to dissipate heat coming from the heated nozzle into the environment so that the connection point and the printing head main body and other components of the printing head remain largely unheated, and the printing material is not heated in the upper region.

According to an embodiment not shown, the melting unit or a nozzle arrangement is designed as follows, where appropriate: The melting unit comprises, for example, a cooling element made of aluminum, a connecting piece made of stainless steel, an annular heating element as well as a nozzle unit comprising a nozzle, two sleeves, for example two brass sleeves, and a pipe, for example a Teflon tube or a metal pipe. Via the pipe, the printing material passes through the cooling element into the nozzle where it is liquefied and pushed out downward by the following printing material.

At the lower end, the pipe comprises, for example, a flange that is clamped between the nozzle and the two sleeves. To this end, the inner sleeve, which has a thread on both the inside and the outside, is first screwed onto the nozzle in order to enlarge the supporting surface. Together with the pipe, the inner sleeve and the nozzle are then screwed into the outer sleeve, which also has an internal and external thread and comprises a narrowing on the upper side. The nozzle unit is screwed from below into the connecting piece, which is mounted on the cooling element and surrounded by the heating element. During printing, the connecting piece is heated by the heating element and the heat is transferred via the two sleeves to the nozzle. The connecting piece has an internal thread at both ends and a plurality of recesses in the center in order to reduce the cross section and thus the upward heat flow.

Since an air gap exists between the lower edge of the cooling element and the upper edge of the nozzle unit and since the connecting piece is not in direct contact with the pipe, high temperature gradients can be achieved in the printing material. The transition zone, in which the printing material exists in a viscous state, is thereby reduced, which positively affects the printing result. In contrast to other designs, the direct mounting of the guide tube on the nozzle has, on the one hand, the advantage that there is no gap between the guide tube and the nozzle, in which printing material can accumulate, which can gradually result in an obstruction. On the other hand, maintenance is simplified, since the nozzle unit as a whole can be replaced more easily.

The invention and its optional individual components are further described below with reference to the figures.

FIG. 1 shows a schematic oblique view of an embodiment of a printer according to the invention.

FIG. 2 shows an oblique view of a detail of the moving apparatus.

FIG. 3 shows a schematic view of a moving apparatus, wherein the image plane substantially corresponds to the xy-plane.

FIG. 4 shows two schematic views of a configuration of two drive belts for driving the printing head along the xy-plane, wherein the two belt arrangements shown are preferably arranged in two parallel planes.

FIG. 5 shows a schematic oblique view of the connection system or of the coupling apparatus.

FIG. 6 shows two schematic views of a printing head, wherein the left view is a schematic oblique view. In the right view, the visual axis substantially follows the x-axis.

FIG. 7 shows a schematic view of the steps of a printing head change.

FIG. 8 shows a portion of the moving apparatus, in particular of the base driving apparatus.

FIG. 9 shows the printing bed and the printing platform, or the base body and parts of the base driving apparatus.

FIG. 10 shows a schematic view of the steps for calibrating the apparatus.

FIG. 11 shows a schematic view of a possibly recorded calibration curve, or of a calibration matrix or a calibration surface.

FIG. 12 shows an embodiment of a printing head in an oblique view from the front and from behind in an exterior view.

FIG. 13 shows details of a printing head, in particular of the printing head of FIG. 12, wherein interior details are also shown.

FIG. 14 shows the nozzle unit of a printing head, in particular a nozzle arrangement in an oblique view, in a central sectional view, in a detailed view of the nozzle, and in a sectional view of the nozzle.

FIG. 15 shows an exemplary measurement of the reactive motor voltage in case of a motor load, in particular from 3 phases: 50-70: normal operation, 70-75: increased load, 75-90: standstill.

FIG. 16 shows a supply unit and a material cartridge, in particular a printing material reservoir.

FIG. 17 shows a counter pressure element or a spring plate and a feed unit, or details of the printing material reservoir and its clamping apparatus.

The figures show specific embodiments of individual components possibly independent of each other, wherein features of this or additional components can also be taken from the general descriptive section. For example, the moving apparatus, the connection system or the coupling system, the vertical positioning system or the base driving apparatus, the printing head, the nozzle arrangement of the printing head, and the printing material reservoir can vary independently of each other. The shown and described embodiments of the components and of the combination of components are respectively a possible optional embodiment. The invention results in particular from the features of the claims and from the features of the description. The invention is certainly not limited to the embodiments shown in the figures. For example, the moving apparatus can also be configured to move a printing head that deviates from the printing head shown and described. For example, the described printing head change can also be carried out with a different moving apparatus. For example, the calibration can also be carried out only with the printing head, with two or more printing heads, and in particular also with a different moving apparatus. For example, the moving apparatus can also be used without changeable printing heads. For example, the printing material reservoir can also be used with different printing heads or different moving apparatuses.

The reference symbols correspond to the following components unless otherwise specified: housing 1, building space 2, control unit 3, first printing material reservoir (for model material or supporting material) 4, second printing material reservoir (for model material or supporting material) 5, first supply tube 6, second supply tube 7, first printing head 8, second printing head 9, x-axis 10, y-axis 11, printed object 12, supporting structure 13, printing bed or base body 14, z-axis 15, connection unit 16, toothed belt 17, guide carriage (in x-direction) 18, guide rail (in x-direction) 19, crossbeam 20, guide carriage or linear bearing (in y-direction) 21, guide rail (in y-direction) 22, belt drive or drive unit 23, light barrier (for y-axis) 24, frame 25, deflection sheave 26, belt tensioner 27, side plate 28, light barrier (for y-axis) 29, locking unit 30, deflection sheave 31, nozzle wiper 32, light strip 33, connection plate 34, connection magnet 35, connection plate 36, screw (for mounting the toothed belt) 37, hole (for accommodating the sliding bolt) 38, front supporting profile 39, back supporting profile 40, guide carriage or linear bearing (in z-direction) 41, guide rail (in z-direction) 42, spindle nut 43, spindle or ball screw 44, spindle coupling 45, step motor (for z-axis) 46, axial bearing 47, spring steel plate 48, printing surface 49, plastic plate 50, rivet (for mounting the plastic plates) 51, supporting plate 52, spacer plate 53, heat-resistant magnet 54, heating mat 55, insulating mat 56, spacer bolt 57, countersunk screw (for mounting the supporting plate) 58, printing head front part 59, printing head center part 60, printing head cover plate 61, recess (for toothed belt feed-through) 62, step motor (for material extrusion) 63, flat ribbon cable 64, melting unit 65, axial fan 66, radial fan 67, air duct 68, guide groove 70, counter pressure unit 71, drive roll 72, cooling element 73, nozzle unit 74, cooling element 75, temperature barrier 76, heating element 77, guide pipe or guide tube 78, connecting sleeve 79, nozzle 80, insertion shaft 81, guide rails 82, ejecting unit 83, locking unit 84, non-contact transmission device, such as RFID or NFC unit or non-contact transmission unit 85, feed unit 86, adapter unit 87, material cartridge 88, printing material (model material or supporting material) 89, printing material spool 90, external shell 91, spring plate or counter pressure element (possibly plastic plate) 92, non-contact data transmission chip or non-contact transmission device, such as RFID or NFC chip 93, moving apparatus 94, printing material line 95, data processing device 96, first support element 97, driving carriage 98, coupling apparatus 99, printing head carriage 100, rail section 101, end region 102, second support element 103, holding apparatus 104, parking position 105, holding element 106, movable sliding bolt 107, machine frame 108, xy-kinematics 109, xy-plane 110, first drive belt 111, first belt drive 112, belt drive wheel 113, first drive plane 114, second belt drive 115, second drive belt 116, second drive plane 117, connection point 118, corner position 119, base driving apparatus 120, base drive 121, guide element 122, linear drive 123, linear guide 124, bushing 125, printing platform 126, heating apparatus 127, printing head main body 128, nozzle arrangement 129, decoupling point 130, inner surface 131, clamping apparatus 132, clamping position 133, insertion shaft 134, clamping jaw 135, conveying position 136, printing material drive 137, drive wheel 138, mounting apparatus 139, reference plane 140, surface (of the base body) 141, first printing layer 142, second printing layer 143, connection point (of the nozzle arrangement to the printing head main body) 144.

Schematic Exterior View (FIG. 1):

The present extrusion-based 3D printer comprises a housing (1) with a building space (2), a control unit (3), and one supply unit each for thermoplastic model or supporting material (4/5), which is conveyed in the form of filaments via supply tubes (6/7) to the two printing heads (8/9) inside the building space (2).

The printing heads (8/9), which can be positioned horizontally along the x/y-axis (10/11), apply the printed object (12) and the supporting structures (13) layer by layer onto the printing bed (14), which can be moved vertically along the z-axis (15). The positioning of the printing heads (8/9) and of the printing bed (14) and the selective material extrusion are coordinated by the control unit (3).

Housing and Building Space (FIG. 1)

The building space (2) is surrounded on the sides as well as in the back and at the bottom by the housing (1). A transparent sliding door (not shown) forms the front and top end so that the printed object (12) is protected from external influences (e.g., air draft) during the printing process, and the risk of injuries by movable or hot parts inside the building space (2) is minimized. Fans in the back wall (not shown) ensure continuous air exchange in order to protect the electronic components inside the building space (2) against overheating.

Since the housing (1) does not have a cross bracing at the front upper edge, access to the interior of the building space (2) is made significantly easier. The stability disadvantages resulting therefrom are compensated by appropriate reinforcements at other points. For structural reasons, the housing (1) always has double side walls and a separating wall, which separates the building space (2) from the control and supply units (3, 4, 5) on the left side.

The transparent sliding door (not shown), which extends from the front lower edge to the back upper edge of the housing (1), allows for an unobstructed view of the printed object (12) from various viewing angles even during the printing process. Via telescopic rails on the underside and on the back side of the housing (1), the sliding door can be slid open leftward and in the process covers the control and supply units (3, 4, 5) so that the existing space is used optimally and the printing process can be started only with the door closed for safety reasons. If the door is opened during the printing process, this is detected by a sensor and the printing is discontinued immediately.

Horizontal Positioning System (FIG. 2 and FIG. 3)

Both printing heads (8, 9) and the connection unit (16) located between them, which can be moved by means of two toothed belts (17), are connected to the same guide rail (19) via guide carriages (18). While the one printing head (8) is connected to the connection unit (16) and thus can be positioned in the x-direction (10) ("printing position"), the other printing head (9) waits at the end of the guide rail (19) outside the printing region ("parking position").

The crossbeam (20), on which the guide rail (19) is mounted, is connected at the ends to the lateral guide rails (22) via linear bearings (21) and thus freely movable in the y-direction (11). Via the two toothed belts (17), the crossbeam (20) and thus the active printing head (8) can be positioned in the y-direction (11). The two toothed belts (17) are moved by two drive units (23) each, which consist of a step motor and a drive roll and are installed on the housing (1).

The two guide rails (22), the four drive units (23), one light barrier (24) for referencing the y-axis, and a plurality of deflection sheaves and parts of the vertical positioning system (see FIG. 8) are mounted in a frame (25) made of U-shaped steel sections. This frame offers additional stability and makes it possible to preassemble the horizontal positioning system as a whole. Spacers between the frame (25) and the drive units (23) facilitate the mounting of the deflection sheaves and reduce the transmission of vibrations. Since the screws with which the shaft holders are mounted on the frame (25) are accessible from the outside, the guide rails (22) can still be aligned after the final assembly.

Toothed Belt System (FIG. 4)

Each of the two toothed belts (17) is mounted with both ends on the connection unit (16) and first runs outward until it is deflected forward at the end of the crossbeam (20). After passing the front drive unit (23), it runs in the opposite direction to the back deflection sheave (26) and from there further to the belt tensioner (27) and to the back drive unit (23) on the opposite side. After passing the back drive unit (23), it runs forward again and is deflected at the end of the crossbeam (20) back to the connection unit (16).

The second toothed belt, which has a mirrored course, is located on a second vertical plane in order to avoid an intersection with the first toothed belt. In contrast to a traditional toothed belt system in which at least one drive motor is located on the movable crossbeam, all drive motors used in the system are mounted on the housing so that higher accelerations and travel velocities can be achieved as a result of the lesser movable mass. In contrast to a traditional system, the doubled toothed belt arrangement prevents a tilting of the crossbeam, which would have negative effects on the positioning accuracy of the printing head and on the wear of the guide elements.

The front deflection sheaves serve to increase the wraparound angle of the toothed belt (17) around the front drive units (23) for better force transmission and to reduce the run distance before and after running around the drive unit (23). In this way, the toothed belt opening in the crossbeam (20) can be reduced, which has a positive effect on its stiffness and on space utilization. The back deflection sheaves increase both the wrap-around angle of the toothed belt (17) around the back drive units (23) and the distance between the toothed belt (17) and the frame (25) in order to allow for the mounting of the belt tensioner (27) and of the vertical positioning system (see FIG. 8). By synchronously using two drive motors per toothed belt, not only higher acceleration forces but also higher positioning accuracies can be achieved since the run length between the drive motor and the printing head is shortened and the elasticity of the toothed belt system is reduced.

Linear Guide and Connection System (FIG. 5 and FIG. 6)

The two ends of the crossbeam (20) are connected via U-shaped side plates (28) to the linear bearings (21) which can move freely on the lateral guide rails (22) in the y-direction. On the side plate (28) are additionally located a light barrier (29) for referencing the x-axis, a locking unit (30), two deflection sheaves (31), and a nozzle wiper (32). A light strip (33) on the underside of the crossbeam (20) illuminates the printing bed (14) with the printed object (12) from above.

The guide rail (19) with the three guide carriages (18) is mounted on the back side of the crossbeam (20). The two outer carriages are respectively connected via a connection plate (34) to a printing head (8 or 9). Between them is located an opening for the two toothed belts (17) and for the connection magnet (35). The center carriage is connected to the connection unit (16) which is composed of a U-shaped mounting plate (36) with two screws (37) for mounting the toothed belt (17) and one connection magnet (35) each on both sides. During the printing process, the active printing head (8) is connected via the connection magnet (35) mounted on the connection plate (34) to the connection unit (16) and can thus be positioned, while the inactive printing head (9) is held in its parking position at the end of the guide rail (19) by the locking unit (30).

In order to park the active printing head (8), it is moved from the connection unit (16) to its parking position and held there by the locking unit (30) by moving the sliding bolt (not shown) out into a corresponding hole (38) in the connection plate (34). When the connection unit (16) now moves back to the center of the printing region, the two connection magnets (35) are pulled apart by the force of the toothed belt (17), and the printing head (8) is thus separated from the connection unit (16).

In order to activate the parked printing head (9), the connection unit (16) moves to said printing head's parking position until the connection magnets (35) connect to one another, before the printing head (9) is released by opening the locking unit (30). The connection unit (16) subsequently moves together with the printing head (9) back into the printing region and, in doing so, passes the nozzle wiper (32) in order to remove previously discharged and possibly overflowing printing material before the printing is continued with the new printing head (9).

Since the parked printing head (9) is located outside the printing region, there is no risk of the printed object (12) being contaminated by uncontrolledly overflowing printing material. In order to prevent this, the inactive nozzle in a dual-nozzle printing head would have to be completely cooled prior to a material change and reheated prior to another material change, which would take significantly more time. Alternatively, the inactive nozzle would have to be mechanically lifted and covered, which would be very complicated to implement, in particular in light of the narrow tolerances in the distance from the printing bed (14). Since only the active printing head (8) must be moved in the x-direction while the inactive printing head (9) remains in its parking position, higher accelerations and thus higher printing speeds can be achieved with the same toothed belt force as a result of the lesser movable mass. The automatic calibration (see FIG. 10) is also made significantly easier, since the printing bed (14) can be scanned separately by both printing heads, while the respectively other printing head is in its parking position outside the printing region. Otherwise, the vertical distance of the two nozzles would have to be adjusted manually with great effort.

There is also the possibility of removing both printing heads simultaneously from the printing region so that the printing bed (14) can be moved upwards up to the underside of the crossbeam (20). This makes it possible for the printed object (12) to be ejected automatically after the printing process has ended by moving it off of the printing bed (14) forward or backward using the crossbeam (20).

Automatic Printing Head Change (FIG. 7)

The automatic printing head change takes place as follows, for example:
1) First, the connection unit (16) together with the first printing head (8) is moved to the parking position of the second printing head (9).
2) Next, the locking units (30) are opened on both sides so that the second printing head (9) is released.
3) Then, the connection unit (16) together with both printing heads (8/9) is moved to the parking position of the first printing head.
4) Once there, the two locking units (30) are closed again so that the first printing head (8) is held in its parking position.
5) Lastly, the connection unit (16) together with the second printing head (9) is moved back into the printing region again.
6) Now the second printing head (9) is in the printing position.

In contrast to a printing head change in which the active printing head (8) is parked before the parked printing head (9) is reactivated, the two locking units (30) can be connected in parallel in order to simplify control. If the locking units (30) were opened before connecting the second printing head (9), the latter may be released from its parking position by vibrations, for example, and, when approaching the connection unit (16), may uncontrolledly collide with said connection unit and thus damage the connection magnets (35). This also ensures that the automatic referencing of the x-axis is still possible even after a system restart during the printing head change since at least one of the two light barriers (29) is uncovered at any time.

Vertical Positioning System (FIG. 8) The printing platform (not shown) is supported by a supporting structure, which in this case is composed of three U-shaped supporting profiles (39) and an L-shaped back wall (40). On the latter are mounted two linear bearings (41) which can be moved vertically in the z-direction on two guide rails (42). The guide rails (42) are mounted on the frame (25) and on the underside of the housing (not shown) so that they can still be aligned even after the final assembly. The vertical positioning takes place via a spindle nut (43), which is also mounted on the back wall of the supporting structure (40) and can be moved vertically by means of a ball screw (44). The latter is connected via a coupling (45) to a step motor (46) which is mounted on the upper side of the frame (25). Between the coupling (45) and the underside of the frame (25) is located an axial bearing (47) in order to relieve the occurring axial forces acting on the step motor (46).

Printing Bed and Printing Platform (FIG. 9)

The removable printing bed (14) consists, for example, of a ferromagnetic spring steel plate (48) with a special printing surface (49) and two plastic plates (50) each on both sides, which are held by rivets (51) and serve as handles when removing the printing bed (14) in order to prevent injuries as a result of sharp edges, or burns as a result of hot surfaces. The upper plastic plates (50) can additionally be used to fix the printing surface (49) on the spring steel plate (48), while the lower plastic plates (50) help in centering the printing bed (14) on the printing platform located underneath. The printing platform also consists of a plurality of layers. Under the supporting plate (52) made of ferromagnetic steel is located a spacer plate (53) with recesses for heat-resistant magnets (54) which magnetize the supporting plate (52) from below so that the ferromagnetic printing bed (14) adheres to it. Under the spacer plate (53), which can consist of aluminum for the purposes of thermal conduction and to save weight, is mounted a heating mat (55) which heats the printing bed (14) from below during printing in order to improve the adherence of the printed object (12) to the printing surface (49). An insulating mat (56) below the heating mat (55) reduces heat losses occurring downward.

Since the insulating mat (56) does not offer sufficient stability, the supporting plate (52) and the spacer plate (53) are connected to the supporting profiles (39) of the vertical positioning system via spacer bolts (57). Countersunk screws (58) are used for mounting in order to improve the thermal conduction to the printing bed (14) by means of a flat contact surface between the supporting plate (52) and the spring steel plate (48).

A removable printing bed (14) has the advantage that it can be removed together with the printed object (12) from the building space (2) after printing, without having to detach the printed object (12) beforehand. By using the spring steel plate (48), detaching is moreover made easier since the printing bed (14) can be bent backward slightly on the sides. Alternatively, the printing bed (14) can be placed together with the printed object (12) into a solvent in order to remove the soluble supporting structures (13) and thus detach the printed object (12) from the printing bed (14). Since the printing surface (49) can become worn over time, the removable printing bed (14) can moreover be very easily exchanged.

Automatic Printing Bed Calibration (FIG. 10 and FIG. 11)

For reliable printing, it is important that the distance between the printing surface (49) and the nozzle of the printing head (8, 9) is adjusted very precisely since a distance that is too small can result in an obstruction and a distance that is too large can result in a detaching of the printed object (12) or the supporting structures (13) from the printing surface (49). As a result of manufacturing and assembly-related inaccuracies, it is therefore advantageous to precisely calibrate the distance prior to bringing the 3D printer into operation. In order to achieve the best possible printing results, this should occur prior to each new printing job.

In contrast to a manual calibration, which is especially very complicated and challenging for a plurality of printing heads (8, 9), the automatic calibration helps to save time and prevent errors. To this end, the printing bed (14) is divided in a chessboard pattern into at least three calibration points, which are approached by the printing head (8) sequentially. At each calibration point, the printing bed (14) is moved upward until it touches the printing head (8) and stores the corresponding position. Afterwards, it is moved downward again, and the procedure is repeated at the next calibration point. After all calibration points have been approached, the alignment and the surface contour (in case of more than 3 calibration points) of the printing bed (14) are determined from the collected data by regression. During subsequent printing, the vertical position of the printing bed (14) can thus be adapted dynamically depending on the horizontal position of the printing head (8) so that the nozzle always has the same distance from the printing surface (49) or from the printed object (12). An oblique position of the printed object (12) in consequence of an obliquely standing printing bed (14) can also be compensated by a corresponding horizontal displacement of the individual layers.

By approaching any calibration point with the second printing head (9), the vertical distance between the nozzle of the two printing heads can moreover be determined and also compensated during subsequent printing. In the case of a dual-nozzle printing head or a mechanical calibration, a compensation of the vertical distance of two nozzles would not be possible. Another advantage of the dynamic compensation with more than three calibration points is moreover the possibility of compensating unevennesses of the printing surface (49).

The exact contact point is, for example, determined by means of an acceleration sensor (not shown), which registers vibrations occurring during the collision of the printing head (8, 9) and the printing bed (14). Another possibility for determining the contact point is the monitoring of the motor signal ("back EMF") for driving the vertical positioning system, which signal changes as soon as the upward moving printing bed (14) encounters a resistance.

Since the calibration is preferably based on the direct contact between the nozzle tip and the printing surface (49), no relative errors occur in contrast to other methods (with separate surface scanning). Thus, when using a retractable microswitch ("z probe") for scanning the printing surface (49) between the nozzle tip and the switchover point of the microswitch, there is always an erroneous distance, which negatively affects the accuracy of the calibration. In the present case, forty-nine calibration points distributed in a chessboard pattern are used, for example, which are always approached three times in order to improve the accuracy of the measurements by averaging. If the deviation of a measurement from the average value is too high, the three measurements are repeated in order to prevent incorrect measured values as a result of external influences. It has been shown that the calibration with a cold nozzle functions most reliably since the measurement results of the acceleration sensor can otherwise be falsified by the vibrations of the fan running in case of a hot nozzle or by printing material exiting from the hot nozzle.

During printing, a provided acceleration sensor, where appropriate, can moreover be used to measure the movement frequency. As soon as the latter reaches a critical frequency range, the printing speed can temporarily be adjusted in order to prevent otherwise occurring resonances.

FIG. 11 shows in particular a schematic illustration of the mathematical model of a reference plane 140, a surface (of the base body) 141, a first printing layer 142, and a second printing layer 143.

Printing Head (FIG. 12, FIG. 13)

The printing head (8, 9) consists, for example, of an injection-molded front and center part (59, 60), and of a back cover plate (61), inter alia. The front part (59) is mounted on the connection plate (34) and has, on the front side, a recess (62) for the two toothed belts (17) and the connection magnet (35). A step motor (63) for the material extrusion and a flat ribbon cable (64) for the power supply and signal transmission are also mounted on the front part (59).

In the recess in the underside of the printing head (8, 9) is located the melting unit (65) in which the solid printing material is liquefied before it is applied onto the printing bed (14). This melting unit is cooled by an axial fan (66) mounted on the cover plate (61).

The cooling of the applied printing material is carried out by a radial fan (67) mounted between the center part (60) and the cover plate (61) in connection with an air duct (68) extending inside.

The supply tube (6, 7), via which the printing material arrives from the side into the printing head (8, 9), is held by a self-gripping tube coupling (69). Via a guide groove (70), the printing material is guided downward where it is pushed against the drive roll (72) by a horizontally movable carriage (71) with a spring on the one side and an idler on the other side. This drive roll is driven by the step motor (63) and conveys the printing material into the melting unit (65) which is located below it and is mounted at its upper end between the front and center part (59, 60).

In order to accelerate the solidifying of the extruded material on the printing bed (14) and to thus improve the printing quality, the extruded material can be cooled in all embodiments. To this end, the radial fan (67) generates an air flow which is guided forward through openings in the center part (60), and downward through air ducts (68) between the front and center part (59/60) on both sides of the melting unit (65). By means of outlets at the lower end, the air flow is finally guided inward, where the liquid material exits the nozzle. In comparison to a one-sided cooling, the two-sided cooling achieves a significant improvement of the printing quality.

Melting Unit (FIG. 14)

The nozzle arrangement or the melting unit (65) comprises a heating unit (73) and a nozzle unit (74) in which the printing material is guided. The heating unit (73) comprises a cooling element (75), on which an annular heating element (77) is mounted via a spiral-shaped temperature barrier (76). The nozzle unit (74) comprises a guide pipe (78) which is mounted on the nozzle (80) via a conical connecting sleeve (79) and screwed into the cooling element (75) from below in order to thus connect the nozzle unit (74) to the heating unit (73).

Since the nozzle (80) can become obstructed over time, a high ease of maintenance is of crucial importance. By using a nozzle unit (74) that can be replaced as a whole, the nozzle change is made significantly easier since the nozzle (80), in contrast to the traditional design in which the nozzle (74) is directly connected to the heating element (77), must neither be heated beforehand nor disconnected from the latter.

If the nozzle unit (74) is screwed into the heating unit (73), the conical connecting sleeve (79) is pushed against the also conical inner surface at the lower end of the cooling element (75) so that heat from the heating element (73) can be transferred via this cooling element and the connecting sleeve (79) to the nozzle (80). In doing so, the spiral-shaped temperature barrier (76) reduces the heat flow upward and simultaneously serves as a suspension in order to improve the contact between the heating unit (73) and the nozzle unit (74) and thus the heat transfer to the nozzle (80). It is of crucial importance for the printing quality for the printing material to be heated quickly and for the transition zone between the solid and liquid state to be kept as short as possible by means of a high temperature gradient in the printing material. For this reason, the heat transfer to the nozzle (80) must be as high as possible, but as low as possible upward, wherein the upwardly occurring heat losses must be dissipated quickly in the upper region by means of active cooling.

For a better dissipation of the upwardly occurring heat losses and for a better heat transfer to the nozzle (80), the cooling element (75) should be produced from a thermally well-conducting material, such as aluminum. The same applies to the connecting sleeve (79) and to the nozzle (80). On the other hand, the guide pipe (78) should be produced from a thermally poorly conducting material, such as stainless steel or titanium, in order to allow for a high temperature gradient along the printing material. In order to increase the service life of the nozzle unit (74), the inner surface of the guide pipe (78) can have a friction as low as possible with respect to the partially viscous printing material, which can be achieved by surface finishing methods, such as polishing, hardening, galvanizing, or coating. Polishing and nitrating as well as a galvanic PTFE coating of the inner surface are in particular possible for this purpose.

Automatic Material Flow Monitoring (FIG. 15)

By measuring the reactive motor voltage ("back EMF"), the motor load in the printing head can be determined so that potential extrusion problems (for example, as a result of an obstruction) can be detected early and eliminated early on. While the measured value ("stall value") during a normal extrusion is relatively constant (t=50-60), it initially drops when extrusion problems occur (t=60-75), and fluctuates strongly when the motor skips steps due to the high load (t=75-90). Extrusion problems are detected as soon as the sliding standard deviation ("moving sigma") exceeds a certain value.

When extrusion problems occur, the printing process is, for example, interrupted automatically and a cleaning procedure is carried out, in which the printing material in the printing head is advanced and retracted several times in order to rinse any accumulations from the nozzle before printing is continued at the same point. If extrusion problems continue to be detected, the cleaning procedure is repeated until the user is asked after the third unsuccessful attempt to change the nozzle.

The measurement of the reactive motor voltage (back EMF) moreover supports the automatic material insertion (see "material cartridge and supply unit"). As soon as the motor load increases, the printing material, which is conveyed by the feed unit to the printing head, has reached the motor and is pushed by it into the still-cold nozzle. The printing material is thus completely inserted and must not be inserted further by the feed unit.

Supply Unit and Material Cartridge (FIG. 16)

The two supply units (4, 5) for model and supporting material are mounted on both sides of the separating wall on the left side of the building space (2). They comprise an insertion shaft (81), two pairs of guide rails (82), an ejecting unit (83), a locking unit (84), a non-contact transmission device such as an RFID or NFC unit (85), a feed unit (86), and an adapter unit (87).

The printing material (89) is located on a spool (90) inside the material cartridge (88) and exits it via a guide channel between the two injection-molded external shells (91) at the back upper end. Shortly before the outlet opening is a recess for the feed unit (86) as well as a spring plate made of plastic (92) which pushes the printing material (89) against the opposite wall of the guide channel and thus prevents the printing material from falling inside the material cartridge (88). On the back wall of the material cartridge (88) is mounted a non-contact transmission device, such as an RFID or NFC chip (93), which can be read and written on by the non-contact transmission device, such as the RFID or NFC unit (85), on the back wall of the insertion shaft (81).

The RFID technology allows, for example, the automatic and contactless identification of objects by means of radio waves. An RFID chip consists of a microchip with a storage unit and an antenna. The RFID module is simultaneously transmitter and receiver and can read or manipulate the data stored on an RFID chip located nearby. Even if other technologies can be used for the communication between the material cartridge and the printer, RFID technology is representatively assumed here. However, as an alternative to an RFID chip, any suitable non-contact transmission devices can be used in all embodiments.

If a material cartridge (88) is inserted into a supply unit (4/5), the guide rails (82) engage in the upper and lower inner surface of the insertion shaft (81) in corresponding grooves in the material cartridge (88), and the ejecting unit (83) mounted on the back wall of the insertion shaft (81) is tensioned. As soon as the correct position is reached, the locking unit (84) snaps into a corresponding recess in the upper side of the material cartridge (88) and thus fixes it in the correct position.

At the same time, the printing material (89) is pushed by the feed unit (86) against the spring plate (92) in the material cartridge (88) so that it detaches from the wall of the guide channel and can be moved by the feed unit (86) (see FIG. 17). Since the service life of the spring plate (92) must only reach the service life of the material cartridge (88), the wear as a result of friction is unproblematic.

As soon as the material cartridge (88) has been inserted completely, the non-contact transmission unit, in particular the RFID unit (85), reads the non-contact transmission device located on it, in particular the RFID chip (93), on which, where appropriate, are stored all information about the contained printing material (89), such as the serial number, material type, expiration date, security code, and remaining material quantity, which is updated after each use. In this context when a material cartridge (88) is inserted, the type of material, whether it can still be used, and whether it is sufficient for the upcoming printing are automatically detected. The material-dependent parameters, such as the printing temperature, can moreover be adjusted to the inserted material cartridge (88) automatically.

Before the printing starts, the printing material (89) is first pushed out of the material cartridge (88) by the feed unit (86), inserted into the supply tube (6, 7) via an adapter unit (87), and conducted further in this supply tube to the printing head (8, 9). As soon as the printing material (89) has reached the motor in the printing head (63) which is detected by measuring the reactive motor voltage ("back EMF," see above), the nozzle (77) can be heated, and the printing can be started. During the printing process, the two motors in the feed unit (86) and in the printing head (63) run synchronously in order to ensure a consistent material supply.

Before the material cartridge (88) can be removed again, the printing material (89) must first be conveyed from the supply tube (6, 7) back into the material cartridge (88) by said printing material being retracted by the feed unit (86). As soon as the sensor in the adapter unit (87) detects that the printing material (89) has completely left the supply tube (6, 7), the locking unit (84) is opened so that the material cartridge (88) is pushed forward slightly by the ejecting unit (83) and can be removed from the supply unit (4/5).

The invention claimed is:

1. An apparatus for forming a dimensionally stable, three-dimensional object by consecutively or continuously applying and hardening a shapeable printing material, comprising:
a base body that provides a base upon which the object is built,
two printing heads that are each operable to apply a respective printing material,
a moving apparatus operable to change a relative position of the two printing heads in relation to the base body, and
two printing material reservoirs, each of which, in use, holds the printing material for a respective one of the printing heads and which is coupled to supply the printing material to one of the printing heads,
wherein the moving apparatus comprises at least one elongated first support element that extends along an x-axis, the elongated first support element comprising two opposite ends, wherein each of the two printing heads is connected to a respective one of two printing head carriages connected to the first support element, and each of the two printing heads is linearly guided along the x-axis on the first support element via the respective one of the two printing head carriages, wherein a driving carriage connected or connectable to the two printing heads is linearly and parallelly guided along the x-axis on the first support element, and wherein the driving carriage comprises a coupling apparatus, and the driving carriage is selectively coupleable, via the coupling apparatus, with one of the printing heads, with none of the printing heads, and with both printing heads alternatively, wherein each of the two printing heads remains connected to the respective one of the two printing head carriages when the driving carriage is selectively coupled with and de-coupled from each of the two printing heads during operation, wherein a parking position for a printing head is provided in at least one of the ends of the first support element, wherein the parking position comprises a holding apparatus for temporarily fixing the respective printing head at the parking position, and wherein a control unit is provided that, in use, causes the driving carriage to be selectively coupled, via the coupling apparatus, with one of the printing heads, with none of the printing heads, and with both printing heads alternatively, to form the three-dimensional object and to change which one of the two printing heads is an active printing head during the formation of the three-dimensional object.

2. The apparatus according to claim 1, wherein the connection, established by the coupling apparatus, of the driving carriage to the printing head is a magnetic or a force-fit connection that can be disconnected by overcoming the holding force of the coupling apparatus by moving the driving carriage along the x-axis.

3. The apparatus according to claim 1, wherein the coupling apparatus comprises a magnetic or magnetizable body, which is coupleable or coupled with an element of the printing head via magnetic forces.

4. The apparatus according to claim 1, wherein the driving carriage is arranged along the extension of the first support element between the two printing head carriages of the two printing heads.

5. The apparatus according to claim 1, wherein the first support element comprises a rail section, in which the printing heads can be moved and positioned along the x-axis.

6. The apparatus according to claim 1, wherein the first support element comprises a rail section along which the printing heads can be moved and positioned along the x-axis, and wherein the parking position is a first parking position for temporarily fixing a first one of the two printing heads, and the holding apparatus is a first holding apparatus, wherein the apparatus comprises a second parking position for a second one of the two printing heads that is provided in the end of the first support element opposite the end in which the first parking position is provided, and wherein the second parking position comprises a second holding apparatus for temporarily fixing the second printing head at the second parking position, and the first and second holding apparatuses respectively comprise a holding element, the holding element comprising a movable sliding bolt, and the holding elements of the first and second holding apparatuses are simultaneously actuatable, in a synchronized manner or in a manner mechanically coupled with each other, or the holding elements of the first and second holding apparatuses are actuatable independently of each other.

7. The apparatus according to claim 1, wherein the moving apparatus further comprises at least one elongated second support element that extends along the y-axis, the first support element is linearly and parallelly guided along the y-axis on the second support element, the second support element is connected to a machine frame in a stationary or rigid manner, and the driving carriage is connected or connectable to the printing head is linearly and parallelly guided along the x-axis on the second support element so that xy-kinematics for moving the printing head in an xy-plane are established.

8. The apparatus according to claim 1, wherein the moving apparatus comprises a first drive belt connected to the driving carriage and operable to move the printing heads, at least a first belt drive with a belt drive wheel coupled to drive the drive belt and a first plurality of deflection sheaves positioned to deflect the drive belt, the first belt drive is mounted on a machine frame in a stationary manner, at least one of the deflection sheaves of the first plurality of deflection sheaves is mounted on the first support element and at least one of the deflection sheaves of the first plurality of deflection sheaves is mounted on the machine frame, and the first drive belt substantially runs in a first drive plane that extends parallel to the xy-plane.

9. The apparatus according to claim 8, wherein the moving apparatus comprises a second drive belt connected to the driving carriage and operable to move the printing heads, at least a second belt drive with a belt drive wheel coupled to drive the drive belt and a second plurality of deflection sheaves positioned to deflect the second drive belt, the second belt drive is mounted on the machine frame in a stationary manner, at least one of the deflection sheaves of the second plurality of deflection sheaves is mounted on the first support element and at least one of the deflection sheaves of the second plurality of deflection sheaves is mounted on the machine frame, and the second drive belt substantially runs along a second drive plane that extends parallel and at a distance from the first drive plane and/or parallel to the xy-plane.

10. The apparatus according to claim 9, wherein the moving apparatus comprises two driven deflection sheaves operable to drive respective ones of the first drive belt and the second drive belt, or the moving apparatus comprises two belt drives coupled to drive respective ones of the first drive belt and the second drive belt, wherein the two driven deflection sheaves or the two belt drives are arranged in the course of the drive belt before or after a connection point to the driving carriage, and that the two drives are synchronized.

11. The apparatus according to claim 9, wherein the moving apparatus comprises two belt drives or two driven deflection sheaves coupled to respective ones of the first drive belt and the second drive belt, wherein the two belt drives or the two driven deflection sheaves are mounted on the machine frame in a corner position each in the course of the drive belt immediately before and after a connection point to the driving carriage.

12. The apparatus according to claim 11, wherein the moving apparatus comprises a base driving apparatus operable to move the base body along a z-axis,
wherein the base driving apparatus comprises a base drive and at least one guide element,
wherein the base drive is a linear drive and comprises a step motor with a spindle and a spindle nut in effective contact with a ball screw, and wherein the guide element is a linear guide comprising a bushing guided along a rail.

13. The apparatus according to claim 1, wherein the moving apparatus comprises a base driving apparatus coupled to move the base body along the z-axis,
wherein the base driving apparatus comprises a base drive and at least one guide element,
wherein the base drive is a linear drive and comprises a step motor with a ball screw and a spindle nut in effective contact with the ball screw,
wherein the guide element is a linear guide and comprises a bushing guided along a rail,
and further comprising a printing platform that is cantilevered to hold the base body, which substantially extends normally to the movement direction of the base body in a plane parallel to the xy-plane, and which can be moved and driven along the z-axis via the base driving apparatus.

14. A method of operating an apparatus to form a dimensionally stable, three-dimensional object by consecutively or continuously applying and hardening two shapeable printing materials, and for changing an active printing head, the apparatus comprising:
a base body that provides a base upon which the object is built,
two printing heads, a first printing head and a second printing head, that are each operable to apply a respective printing material,
a moving apparatus operable to change a relative position of the two printing heads in relation to the base body, and
two printing material reservoirs, each of which, in use, holds the printing material for a respective one of the printing heads and which is coupled to supply the printing material to one of the printing heads,
wherein the moving apparatus comprises at least one elongated first support element that extends along an x-axis, the elongated first support element comprising two opposite ends,
wherein each of the two printing heads is connected to a respective one of two printing head carriages connected to the first support element, and each of the two printing heads is linearly guided along the x-axis on the first support element via the respective one of the two printing head carriages,
wherein a driving carriage connected or connectable to the two printing heads is linearly and parallelly guided along the x-axis on the first support element, and wherein
the driving carriage comprises a coupling apparatus, and the driving carriage is selectively coupleable, via the coupling apparatus, with one of the printing heads, with none of the printing heads, and with both printing heads alternatively, wherein each of the two printing heads remains connected to the respective one of the two printing head carriages when the driving carriage is selectively coupled with and de-coupled from each of the two printing heads during operation,
wherein a parking position for a printing head is provided in at least one of the ends of the first support element,
wherein the parking position comprises a holding apparatus for temporarily fixing the respective printing head at the parking position;
the method comprising:
causing, by a control unit, the driving carriage to be selectively coupled, via the coupling apparatus, with one of the printing heads, with none of the printing heads, and with both printing heads alternatively, to form the three-dimensional object and to change which one of the two printing heads is an active printing head during the formation of the three-dimensional object.

15. The method according to claim 14, further comprising:
moving the driving carriage and the first printing head coupled with the driving carriage via the coupling apparatus to the second printing head, which is in a parking position arranged in the end of the first support element and locked in place there temporarily by the holding apparatus,
coupling the second printing head with the driving carriage via the coupling apparatus so that the driving carriage is connected to both printing heads,
releasing the holding apparatus of the second printing head so that the second printing head can be moved from its parking position,
moving the driving carriage and the two printing heads coupled with the driving carriage via the coupling apparatus to the parking position of the first printing head at the opposite end of the first support element,
closing the holding apparatus of the first printing head and releasing the first printing head from the driving carriage by releasing the coupling apparatus so that the first printing head is locked in place in its parking position,
moving the driving carriage and the second printing head coupled with the driving carriage via the coupling apparatus.

16. The method according to claim 14, wherein the holding apparatus of the first printing head and the holding apparatus of the second printing head are released or closed simultaneously, in a synchronized manner or in a manner coupled with each other.

17. The method according to claim 14, wherein, in order to lock a printing head in place in the parking position, the printing head is moved into the respective end of the first support element, the respective holding apparatus is then closed, and the coupling apparatus is then disconnected by moving the driving carriage away and by overcoming the holding force.

* * * * *